(12) United States Patent
Abe

(10) Patent No.: US 11,211,847 B2
(45) Date of Patent: Dec. 28, 2021

(54) HINGE DEVICE PROVIDED WITH POWER GENERATING DEVICE AND CAPABLE OF EXTRACTING ENERGY FROM USER'S LIVING ACTIVITIES TO GENERATE ELECTRIC POWER

(71) Applicant: Panasonic Intellectual Property Management Co., Ltd., Osaka (JP)

(72) Inventor: Hideaki Abe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 98 days.

(21) Appl. No.: 16/628,324

(22) PCT Filed: May 31, 2018

(86) PCT No.: PCT/JP2018/020989
§ 371 (c)(1),
(2) Date: Jan. 3, 2020

(87) PCT Pub. No.: WO2019/012844
PCT Pub. Date: Jan. 17, 2019

(65) Prior Publication Data
US 2020/0177051 A1  Jun. 4, 2020

(30) Foreign Application Priority Data
Jul. 13, 2017  (JP) .............................. JP2017-137348

(51) Int. Cl.
*E05D 11/00* (2006.01)
*E05D 5/12* (2006.01)
(Continued)

(52) U.S. Cl.
CPC .......... *H02K 7/1853* (2013.01); *E05D 5/128* (2013.01); *E05D 11/00* (2013.01); *E05F 7/00* (2013.01);
(Continued)

(58) Field of Classification Search
CPC .. E05D 7/00; E05D 3/02; E05D 11/00; E05D 5/128; E05D 3/00; E05D 11/105;
(Continued)

(56) References Cited

U.S. PATENT DOCUMENTS

2007/0268132 A1* 11/2007 Milo ..................... E05B 47/02
340/545.1
2009/0273322 A1* 11/2009 Riley ..................... H02K 7/1853
322/3
(Continued)

FOREIGN PATENT DOCUMENTS

CN  104053847 A   9/2014
DE  202006009731 U1  9/2006
(Continued)

OTHER PUBLICATIONS

Translation of KR-2003078327 (Year: 2003).*
(Continued)

*Primary Examiner* — Toan T Vu
*Assistant Examiner* — Elim Ortiz
(74) *Attorney, Agent, or Firm* — Renner, Otto, Boisselle & Sklar, LLP

(57) ABSTRACT

A hinge device includes: a first and a second hinge components having a common reference axis; and a power generating device. The first and the second hinge components are engaged with each other, so as to be rotatable about the reference axis relative to each other, and so that one of the first and the second hinge components supports the other. The power generating device includes a housing and an input shaft, and generates electric power by rotation of the input shaft. The housing of the power generating device is fixed to the first hinge component, so that the input shaft of the power generating device is positioned on the reference axis. The input shaft of the power generating device is
(Continued)

restrained to the second hinge component with respect to the direction of rotation about the reference axis, so that the input shaft of the power generating device rotates by as much as rotation of the second hinge component when the second hinge component rotates about the reference axis.

11 Claims, 18 Drawing Sheets

(51) Int. Cl.
*E05F 7/00* (2006.01)
*H02K 7/18* (2006.01)
*E06B 7/28* (2006.01)
*F16C 11/04* (2006.01)
*H02J 7/00* (2006.01)
*H02K 7/116* (2006.01)
*H02J 7/34* (2006.01)
*H02M 7/06* (2006.01)

(52) U.S. Cl.
CPC .............. *E06B 7/28* (2013.01); *F16C 11/04* (2013.01); *H02J 7/0068* (2013.01); *H02K 7/116* (2013.01); *H02J 7/345* (2013.01); *H02M 7/06* (2013.01)

(58) Field of Classification Search
CPC ......... E05D 11/082; E05D 11/06; E05D 5/00; G16C 11/04; F16C 11/00; G06F 1/1681; E05Y 2201/72; E05Y 2900/132; E05Y 2900/00; E05Y 2201/00; E05F 3/00; E05F 1/00; F25D 23/00; H02K 7/1853; F16H 3/00
USPC .......................... 340/545.1; 307/140; 49/342
See application file for complete search history.

(56) References Cited

U.S. PATENT DOCUMENTS

2014/0345084 A1   11/2014   Herglotz et al.
2014/0346889 A1   11/2014   Abe

FOREIGN PATENT DOCUMENTS

| JP | S59-128875 U | 8/1984 |
|---|---|---|
| JP | S60-080274 U | 6/1985 |
| JP | H03-041078 U | 4/1991 |
| JP | H06-027739 U | 4/1994 |
| JP | 2000-130005 A | 5/2000 |
| JP | 2001-166855 A | 6/2001 |
| JP | 2004-204533 A | 7/2004 |
| JP | 2005-124347 A | 5/2005 |
| JP | 2006-105186 A | 4/2006 |
| JP | 2013-070520 A | 4/2013 |
| JP | 5302913 B2 | 6/2013 |
| JP | 2013-155495 A | 8/2013 |
| JP | 2014-118778 A | 6/2014 |
| JP | 2016-049016 A | 4/2016 |
| JP | 2017172683 A * | 9/2017 |
| KR | 2003078327  * | 3/2002 |

OTHER PUBLICATIONS

Translation of JP-2017172683-A (Year: 2017).*
International Search Report for corresponding Application No. PCT/JP2018/020989, dated Jul. 31, 2018.
Extended European Search Report for Corresponding European Application No. 18831666.5 dated Jun. 24, 2020.
Notification of Reasons for Refusal for corresponding JP Application No. 2019-528976 dated Jan. 12, 2021, with English language translation.
International Preliminary Report on Patentability for corresponding Application No. PCT/JP2018/020989, dated Jan. 23, 2020, with English language translation.
Notification of the First Office Action and Search Report for corresponding CN Application No. 201880046235.0 dated Apr. 29, 2021, with English translation of Search Report.

* cited by examiner

HINGE DEVICE PROVIDED WITH POWER GENERATING DEVICE AND CAPABLE OF EXTRACTING ENERGY FROM USER'S LIVING ACTIVITIES TO GENERATE ELECTRIC POWER

TECHNICAL FIELD

The present invention relates to a hinge device provided with a power generating device, and relates to a power system including such a hinge device.

BACKGROUND ART

In recent years, in consideration of fossil fuel depletion and global warming prevention, utilization of natural energy, and various kinds of ambient energy has been actively promoted. As utilization of the natural energy, for example, it is known to generate electric power using a solar cell or a wind power generator. In addition, as utilization of the ambient energy, for example, it is known to generate electric power using energy obtained from a user's living activities (human-powered generation), piezoelectric energy (vibration power generation), energy of electromagnetic waves such as broadcast waves, or the like. To harvest and use the ambient energy is drawing attention as "energy harvesting".

CITATION LIST

Patent Documents

PATENT DOCUMENT 1: Japanese Patent Laid-open Publication No. JP 2013-070520 A

SUMMARY OF INVENTION

Technical Problem

As an exemplary human-powered generation using energy obtained from a user's living activities, Patent Document 1 discloses incorporating a power generating device into a sliding door and a revolving door. Patent Document 1 refers to incorporating a power generating device into a hinge of a revolving door, but does not disclose how to implement the hinge with the power generating device being incorporated therein. Accordingly, it is required to incorporate a power generating device into a hinge, so as to efficiently extract energy from a user's living activities to generate electric power.

The present disclosure provides a hinge device provided with a power generating device, the hinge device being capable of efficiently extracting energy from a user's living activities to generate electric power. The present disclosure also provides a power system including such a hinge device.

Solution to Problem

According to an aspect of the present disclosure, a hinge device is provided with: first and second hinge components having a common reference axis; and a power generating device. The first and second hinge components are engaged with each other, so as to be rotatable about the reference axis relative to each other, and so that one of the first and second hinge components supports the other. The power generating device is provided with a housing and an input shaft, and generates electric power by rotation of the input shaft. The housing of the power generating device is fixed to the first hinge component, so that the input shaft of the power generating device is positioned on the reference axis. The input shaft of the power generating device is restrained to the second hinge component with respect to a direction of rotation about the reference axis, so that the input shaft of the power generating device rotates by as much as rotation of the second hinge component when the second hinge component rotates about the reference axis.

Advantageous Effects of Invention

According to an aspect of the present disclosure, it is possible to provide the hinge device provided with the power generating device, the hinge device being capable of efficiently extracting energy from a user's living activities to generate electric power.

DESCRIPTION OF EMBODIMENTS

Figure 1:
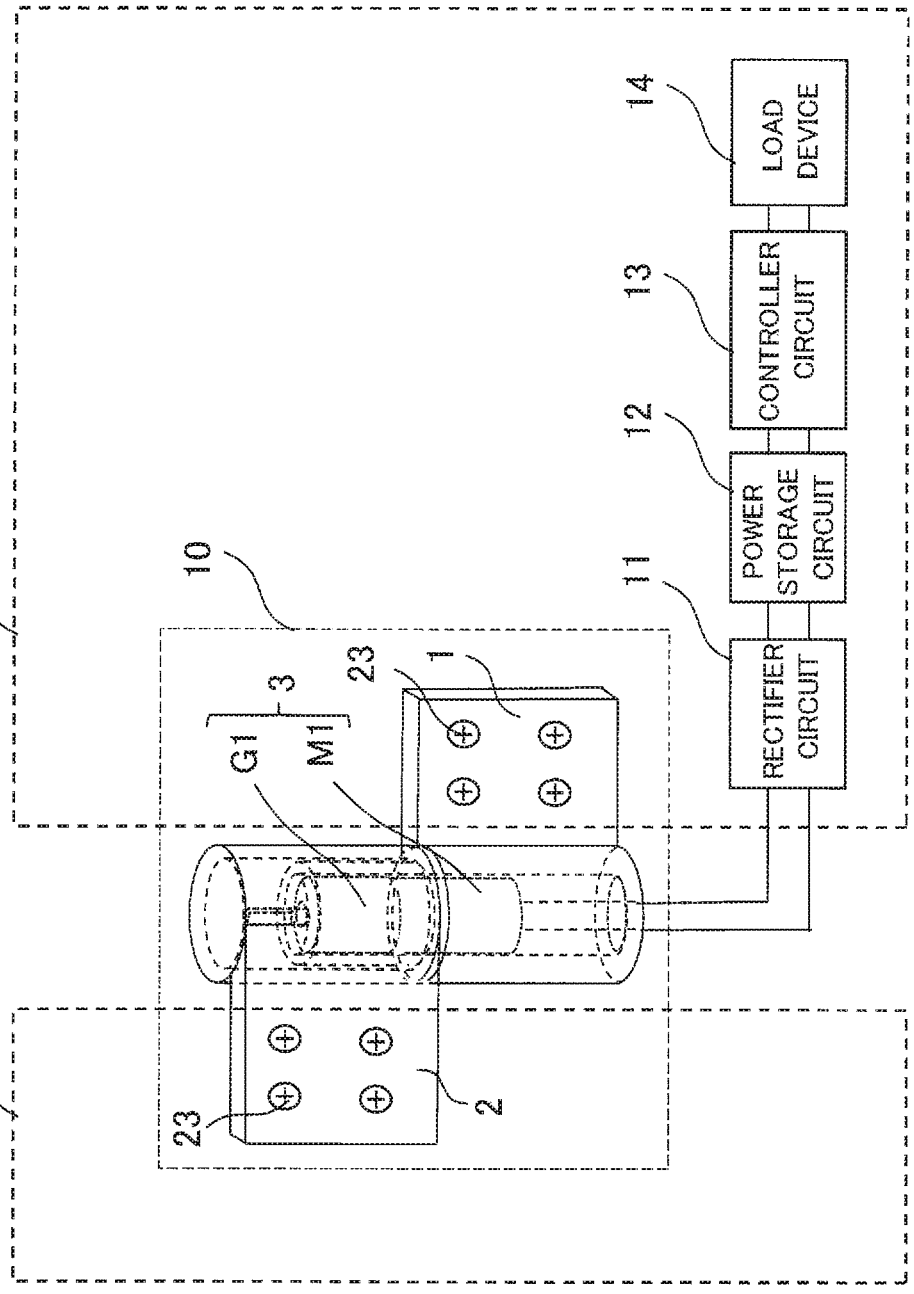
FIG. 1 is a schematic diagram illustrating a configuration of a power system according to a first embodiment.

Hereinafter, embodiments of the present disclosure will be described with reference to the drawings. In the drawings, similar components are denoted by the same reference signs.

First Embodiment

FIG. 1 is a schematic diagram illustrating a configuration of a power system according to a first embodiment. The power system of FIG. 1 is incorporated into, for example, a door including a stationary object 21 and a movable object 22.

The power system of FIG. 1 is provided with a hinge device 10, a rectifier circuit 11, a power storage circuit 12, a controller circuit 13, and a load device 14. The hinge device 10 is provided with a hinge component 1, a hinge component 2, and a power generating device 3. The hinge component 1 is fixed to the stationary object 21 with a plurality of screws 23. The hinge component 2 is fixed to the movable object 22 with a plurality of screws 23. The power generating device 3 is provided with a gear mechanism G1 and a power generator M1.

Figure 2:
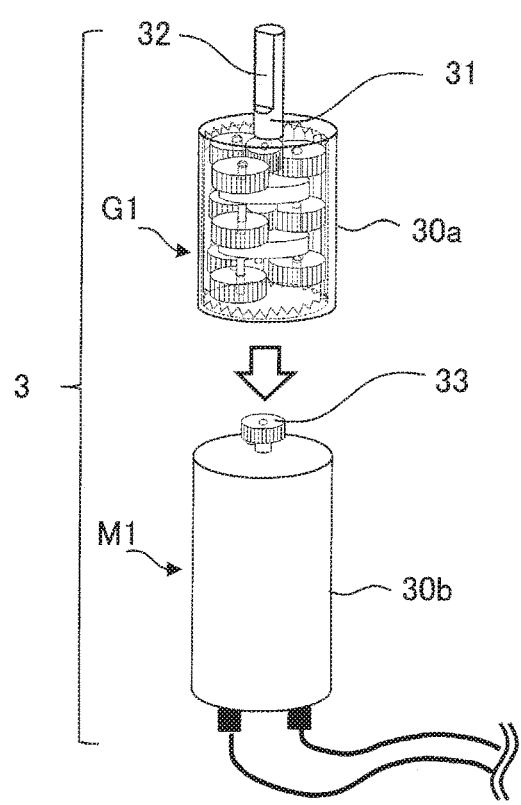
FIG. 2 is an exploded perspective view illustrating a configuration of a power generating device 3 including a gear mechanism G1 and a power generator M1 of FIG. 1.

FIG. 2 is an exploded perspective view illustrating the configuration of the power generating device 3 including the gear mechanism G1 and the power generator M1 of FIG. 1. The gear mechanism G1 is provided with a housing 30a, an input shaft 31, and a plurality of internal gears. The power generator M1 is provided with a housing 30b, an internal rotor and an internal stator (not shown), and a gear 33 coupled to the rotor. Hereinafter, the housings 30a and 30b are collectively referred to as a "housing 30". The gear mechanism G1 transmits rotation of the input shaft 31 to the gear 33 of the power generator M1 at a certain increasing gear ratio. The power generator M1 generates electric power by rotation transmitted by the gear mechanism G1. Accordingly, the power generating device 3 generates electric power (voltage and current) by rotation of the input shaft 31. The gear mechanism G1 may include, for example, a multi-stage planetary gear mechanism. Thus, it is possible to compactly incorporate a gear mechanism having a large increasing gear ratio, in alignment to the input shaft 31 of the power generator M1. The gear mechanism G1 may have, for example, a cylindrical housing 30a. The cylindrical housing 30 is suitable for incorporating the gear mechanism G1 into a hinge device. As will be described with reference to FIGS. 3 to 6, the input shaft 31 has a dent 32 on a side surface thereof, in order to restrain the input shaft 31 to the hinge component 2. The power generator M1 may be a DC generator, or may be an AC generator.

The operation of the power generator and the operation of the motor are reversible. Accordingly, instead of using the gear mechanism G1 having an increasing gear ratio, and the power generator M1, a motor and a gear mechanism having a certain decreasing gear ratio may be used. In this case, the gear mechanism transmits rotation of an output shaft to the motor, at an increasing gear ratio equal to a reciprocal of the decreasing gear ratio. The motor then generates electric power by rotation transmitted by the gear mechanism.

FIGS. 3 to 6 are perspective views illustrating first to fourth steps of assembling the hinge device 10 of FIG. 1.

Figure 3:
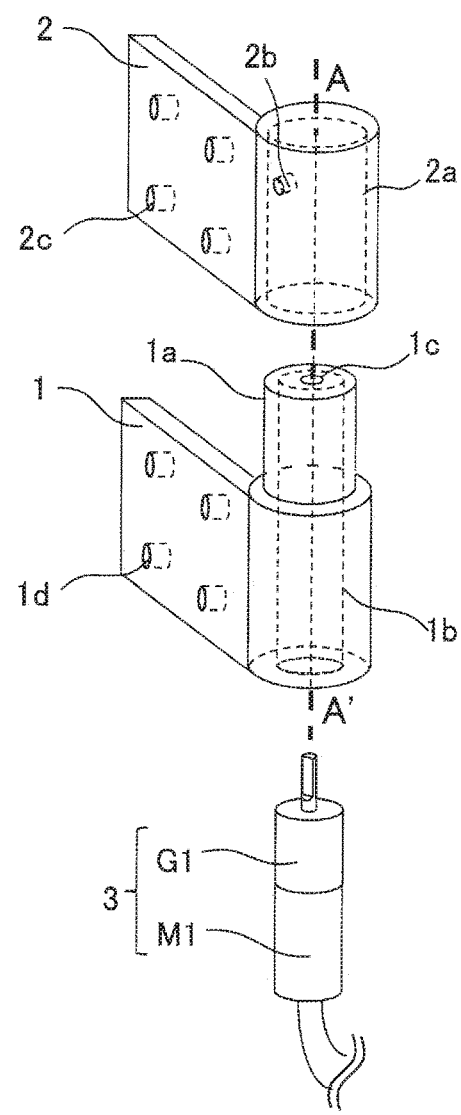
FIG. 3 is a perspective view illustrating a first step of assembling a hinge device 10 of FIG. 1.

As shown in FIG. 3, the hinge component 1 has a cylindrical portion and a planar portion coupled to each other. The cylindrical portion of the hinge component 1 has: a protrusion 1a to be engaged with the hinge component 2, and a recess 1b (hollow) accommodating the power generating device 3. The cylindrical portion of the hinge component 1 is further provided with a through hole 1c at a position where the hinge component 1 and the hinge component 2 are engaged with each other, the through hole is being formed so that the input shaft 31 of the power generating device 3 protrudes from the hinge component 1 toward the hinge component 2. The planar portion of the hinge component 1 has a plurality of screw holes 1d for fixing the hinge component 1 to the stationary object 21 with the plurality of screws 23. The hinge component 2 also has a cylindrical portion and a planar portion coupled to each other. The cylindrical portion of the hinge component 2 has a recess 2a (hollow) into which the protrusion 1a of the hinge component 1 is engaged (inserted), and a screw hole 2b penetrating the hinge component 2 from the outside of the hinge component 2 to the recess 2a. The planar portion of the hinge component 2 has a plurality of screw holes 2c for fixing the hinge component 2 to the movable object 22 with the plurality of screws 23.

Figure 4:
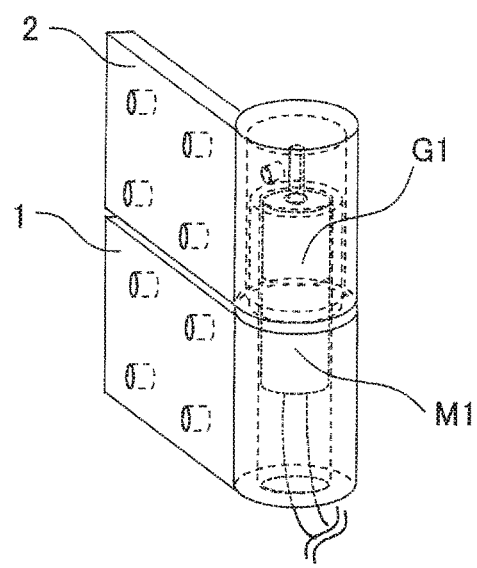
FIG. 4 is a perspective view illustrating a second step of assembling the hinge device 10 of FIG. 1.

As shown in FIG. 4, the hinge component 1 and the hinge component 2 are engaged with each other, so as to be rotatable about a common reference axis (indicated by line A-A' in FIG. 3) relative to each other, and so that one of the hinge component 1 and the hinge component 2 supports the other. Since the protrusion 1a of the hinge component 1 has an outer cylindrical surface, and the recess 2a of the hinge component 2 has an inner cylindrical surface, the hinge component 1 and the hinge component 2 are engaged with each other so as to be rotatable relative to each other. In addition, in the example of FIG. 4, the hinge component 2 is disposed above the hinge component 1, and the hinge component 1 supports the hinge component 2. The cylindrical portion of the hinge component 1 has two portions with different outer diameters. Thus, the weight of the hinge component 2 is applied to the hinge component 1, at a position where the lower end of the cylindrical portion of the hinge component 2 is in contact with the cylindrical portion of the hinge component 1. In addition, as shown in FIG. 4, the power generating device 3 is inserted into the recess 1b of the hinge component 1. The housing 30 of the power generating device 3 is fixed to the hinge component 1 with an adhesive or a screw (not shown), so that the input shaft 31 of the power generating device 3 is positioned on the reference axis.

Except for the position where the hinge component 1 and the hinge component 2 are engaged with each other so as to be rotatable relative to each other (i.e., the protrusion 1a of the hinge component 1, and the recess 2a of the hinge component 2), the outer surfaces of the hinge component 1 and the hinge component 2 may not be cylindrically shaped, but may be shaped as triangular prisms, quadrangular prisms, other polygonal prisms, other polyhedrons.

Figure 5:
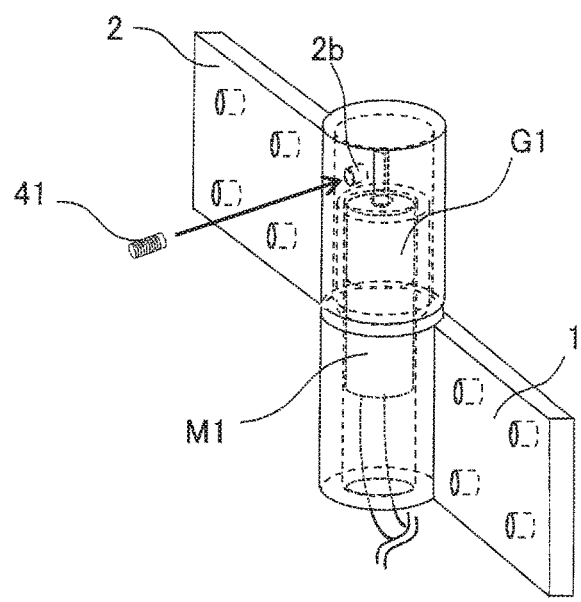
FIG. 5 is a perspective view illustrating a third step of assembling the hinge device 10 of FIG. 1.
Figure 6:
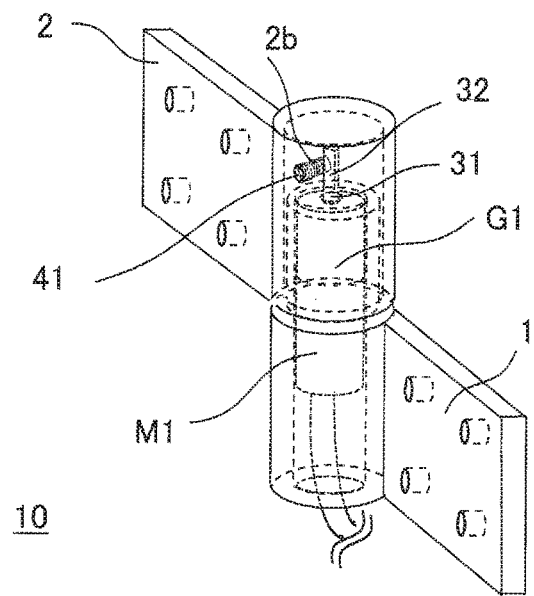
FIG. 6 is a perspective view illustrating a fourth step of assembling the hinge device 10 of FIG. 1.

The recess 2a of the hinge component 2 accommodates the input shaft 31 of the power generating device 3 protruding through the through hole 1c. The input shaft 31 of the power generating device 3 is restrained to the hinge component 2 with respect to the direction of rotation about the reference axis, so that the input shaft 31 of the power generating device 3 rotates by as much as rotation of the hinge component 2 when the hinge component 2 rotates about the reference axis. As described with reference to FIG. 2, the input shaft 31 of the power generating device 3 has the dent 32 on the side surface of the input shaft 31. Accordingly, as shown in FIGS. 5 and 6, a screw 41 is inserted through the screw hole 2b of the hinge component 2, such that the screw 41 extends from the outside of the hinge component 2 to the recess 2a so as to penetrate the hinge component 2 and contact with the dent 32 in the recess 2a. By the screw 41, the input shaft 31 of the power generating device 3 is restrained to the hinge component 2 with respect to the direction of rotation about the reference axis.

The hinge device 10 is made by engaging the hinge component 1 and the hinge component 2 with each other, fixing the housing 30 of the power generating device 3 to the hinge component 1, and restraining the input shaft 31 of the power generating device 3 with respect to the hinge component 2 by the screw 41.

Since the hinge device 10 is configured as shown in FIGS. 3 to 6, the power generating device 3 is incorporated in the hinge device 10. In the hinge device 10, the input shaft 31 of the power generating device 3 protrudes from the through hole 1c, and the input shaft 31 of the power generating device 3 is restrained to the hinge component 2 by the screw 41. Accordingly, rotation of the hinge component 2 can be transmitted to the power generating device 3 accommodated in the recess 1b of the hinge component 1. Thus, it is possible to achieve such a configuration that the power generating device 3 is incorporated in the hinge device 10. Since the power generating device 3 is incorporated in the hinge device 10, it is possible to provide the hinge device 10 having a good appearance.

In addition, since the hinge component 1 supports the hinge component 2, the weight of the hinge component 2 and the movable object 22 is not applied to the pourer generating device 3. The screw 41 does not have to restrain the input shaft 31 of the power generating device 3 to the hinge component 2 with respect to the longitudinal direction of the reference axis, but restrains the input shaft 31 to the hinge component 2 with respect to at least the direction of rotational about the reference axis. Accordingly, it is possible to achieve such a configuration that the weight of the hinge component 2 and the movable object 22 is not applied to the power generating device 3, while the input shaft 31 of the power generating device 3 protrudes from the through hole 1c and the input shaft 31 of the power generating device 3 is restrained to the hinge component 2 by the screw 41. Since the weight of the hinge component 2 and the movable object 22 is not applied to the power generating device 3, it is possible to reliably operate the power generating device 3, without applying an extra mechanical load to the power generating device 3.

In addition, the hinge component 1 and the hinge component 2 having the configuration as shown in FIGS. 3 to 6 are engaged with each other so as to be detachable from each other. For example, it is possible to achieve such a configuration that the hinge component 1 and the hinge component 2 are detachable from each other, by protruding the input shaft 31 of the power generating device 3 from the through hole 1c, and restraining the input shaft 31 of the power generating device 3 to the hinge component 2 by the screw 41. Accordingly, using the hinge device 10, it is possible to easily build the door including the stationary object 21 and the movable object 22.

In the present disclosure, the hinge component 1, to which the housing 30 of the power generating device 3 is fixed, is also referred to as a "first hinge component", and the hinge component 2, to which the input shaft 31 of the power generating device 3 is restrained, is also referred to as a "second hinge component". In addition, in the present disclosure, the "recess" includes a penetrating structure.

Figure 7:
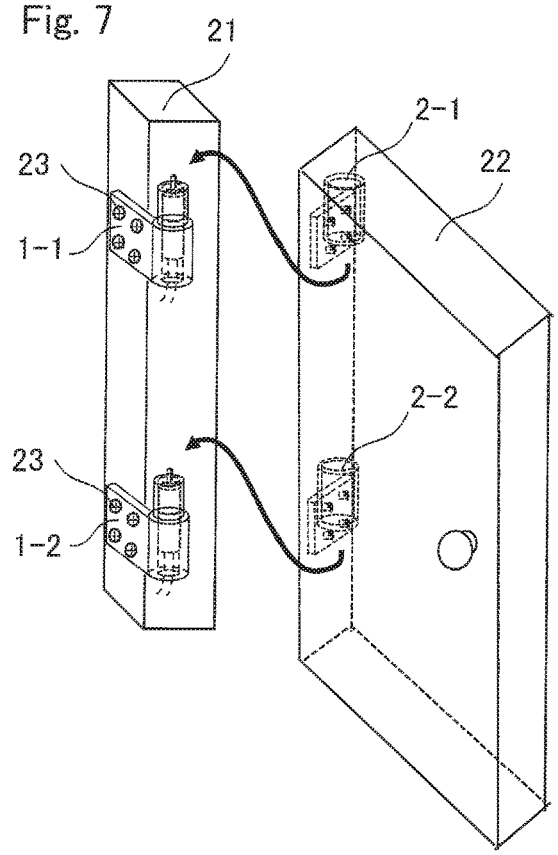
FIG. 7 is a perspective view illustrating a first step of attaching the hinge device 10 of FIG. 1, to a door including a stationary object 21 and a movable object 22.
Figure 8:
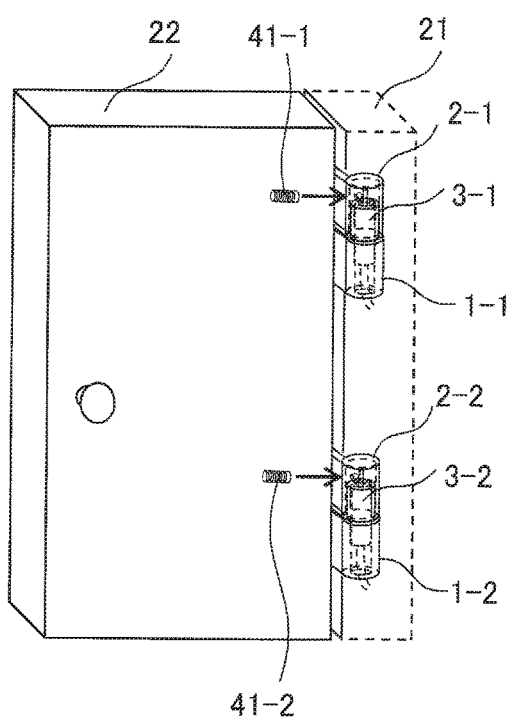
FIG. 8 is a perspective view illustrating a second step of attaching the hinge device 10 of FIG. 1, to the door including the stationary object 21 and the movable object 22.
Figure 9:
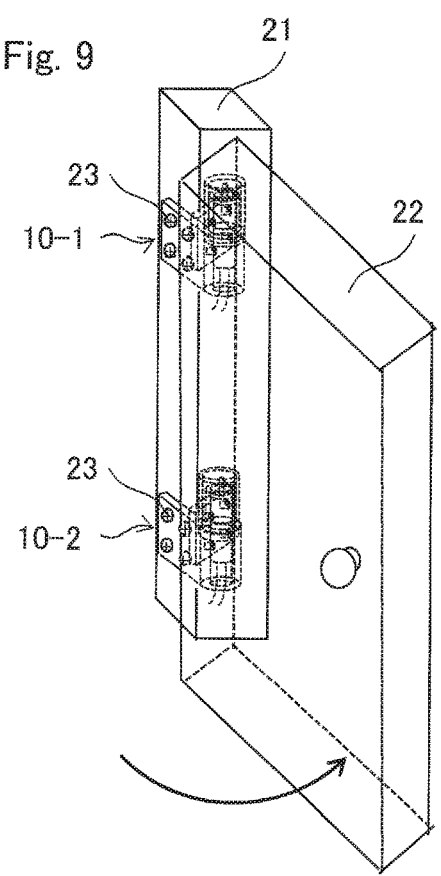
FIG. 9 is a perspective view illustrating a third step of attaching the hinge device 10 of FIG. 1, to the door including the stationary object 21 and the movable object 22.

FIGS. 7 to 9 are perspective views illustrating the first to third steps of attaching the hinge device 10 of FIG. 1, to the door including the stationary object 21 and the movable object 22. FIGS. 7 to 9 illustrate a case where two hinge devices 10-1 and 10-2, configured in a manner similar to that of the hinge device 10 of FIGS. 3 to 6, are attached to the door including the stationary object 21 and the movable object 22. The hinge device 10-1 includes hinge components 1-1 and 2-1 and a power generating device 3-1, and the hinge device 10-2 includes hinge components 1-2 and 2-2 and a power generating device 3-2.

As shown in FIG. 7, the hinge components 1-1 and 1-2 are fixed to the stationary object 21 with a plurality of screws 23. The hinge components 2-1 and 2-2 are also fixed to the movable object 22 with a plurality of screws (not shown). Thereafter, the movable object 22 is attached to the stationary object 21, by engaging the hinge components 1-1 and 1-2 with the hinge components 2-1 and 2-2, respectively, so that protrusions of the hinge components 1-1 and 1-2 are inserted into recesses of the hinge components 2-1 and 2-2, respectively. The hinge components 1-1 and 1-2, and the hinge components 2-1 and 2-2, each configured as shown in FIGS. 3 to 6, are engaged with each other so as to be detachable from each other. It is possible to easily build the door including the stationary object 21 and the movable object 22, by fixing the hinge components 1-1 and 1-2 to the stationary object 21, fixing the hinge components 2-1 and 2-2 to the movable object 22, and then, attaching the movable object 22 to the stationary object 21.

Next, as shown in FIG. 8, the input shaft of the power generating device 3-1 is restrained to the hinge component 2-1 by a screw 41-1, and the input shaft of the power generating device 3-2 is restrained to the hinge component 2-2 by a screw 41-2. In this case, the weight of the movable object 22 is supported by the hinge components 1-1, 1-2, 2-1, and 2-2, and the stationary object 21. Since the weight of the movable object 22 is not applied to the power generating devices 3-1 and 3-2, it is possible to reliably operate the power generating devices 3-1 and 3-2, without applying an extra mechanical load to the power generating devices 3-1 and 3-2.

Thereafter, as shown in FIG. 9, when a user opens or closes the door, the movable object 22 rotates with respect to the stationary object 21 about the reference axis of the hinge devices 10-1 and 10-2. At this time, the power generating devices 3-1 and 3-2 generate electric power by rotation of their input shafts.

Three or more hinge devices 10 may be used for attaching the movable object 22 to the stationary object 21. In a case of using a plurality of hinge devices for attaching the movable object 22 to the stationary object 21, a combination of hinge devices may be used, including: a hinge device 10 according to an embodiment of the present disclosure, provided with a power generating device 3; and a conventional hinge device without a power generating device.

Referring again to FIG. 1, the rectifier circuit 11 rectifies the electric power generated by the power generating device 3 of the hinge device 10. Even if the power generator M1 is a DC generator, the power generator M1 rotates in reverse directions to generate a voltage of reverse polarities, depending on whether the door is opened or closed. Therefore, rectification is required to store the generated electric power in a capacitor or a secondary battery. The power storage circuit 12 is provided with at least one capacitor that stores energy of electric power rectified by the rectifier circuit 11. The controller circuit 13 controls discharging of the power storage circuit 12. The load device 14 consumes electric power of the power storage circuit 12 under control of the controller circuit 13. The load device 14 includes, for example, a lighting device and/or a communication device (wired or wireless).

In the power system of FIG. 1, a force exerted from a user's body is inputted to the power generating device 3 of the hinge device 10, via the movable object 22 of the door. The stationary object 21 and the movable object 22 of the door, and the hinge component 1, the hinge component 2, and the power generating device 3 of the hinge device 10 convert mechanical energy into electrical energy. The rectifier circuit 11, the power storage circuit 12, and the controller circuit 13 convert electrical energy into electrical energy. The output of the power system of FIG. 1 is the work of the load device 14.

The rectifier circuit 11, the power storage circuit 12, the controller circuit 13, and the load device 14 are disposed, for example, on a stationary object 21, as shown in FIG. 1.

Figure 10:
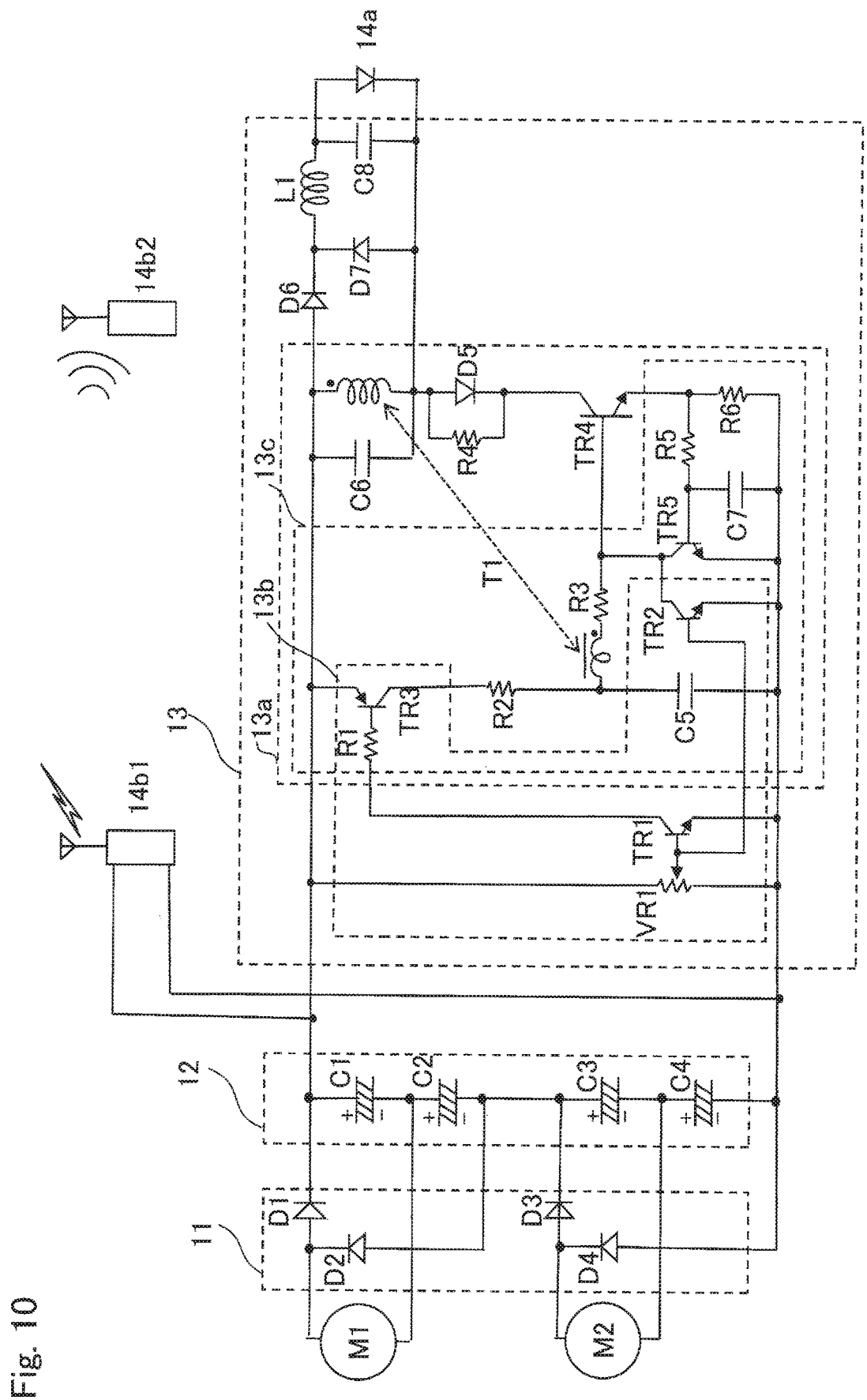
FIG. 10 is a circuit diagram illustrating the configuration of the power system according to the first embodiment.

FIG. 10 is a circuit diagram illustrating the configuration of the power system according to the first embodiment. It is advantageous if a large amount of electric power (energy) is extracted from very short movement of opening and closing the door only once. Therefore, in the power system of FIG. 10, two hinge devices, each provided with a power generating device, are installed at two locations on the door, respectively (see FIG. 9), and the power generators of these power generating devices are cascaded, i.e., connected in series, for use. Further, since the power generator rotates in reverse directions to generate a voltage of reverse polarities, depending on whether the door is opened or closed, voltage-doubling rectification can be used to effectively extract the generated electric power.

The power system of FIG. 10 is provided with power generators M1 and M2 included in the power generating devices of the two hinge devices, respectively. Referring to FIG. 10, the rectifier circuit 11 is provided with four diodes D1 to D4. The power storage circuit 12 is provided with four capacitors C1 to C4. The controller circuit 13 is provided with capacitors C5 to C8, diodes D5 to D7, a coil L1, resistors R1 to R6, a variable resistor VR1, a transformer T1, and transistors TR1 to TR5. In addition, the power system of FIG. 10 is provided with a light emitting diode 14*a* and a wireless transmitter 14*b*1 as components corresponding to the load device 14 of FIG. 1. The wireless transmitter 14*b*1 is wirelessly-communicatively connected with a wireless receiver 14*b*2.

The diodes D1 and D2 and the capacitors C1 and C2 constitute a voltage-doubling rectifier circuit for voltage-doubling rectification of voltage generated by the power generator M1. Similarly, the diodes D3 and D4 and the capacitors C3 and C4 constitute a voltage-doubling rectifier circuit for voltage-doubling rectification of voltage generated by the power generator M2. During a series of actions including movements in reverse directions, such as opening and closing of a door, a voltage of reverse polarities is generated depending on whether the door is opened or closed. By applying the voltage-doubling rectification to the generated voltage, instead of full-wave rectification, it is possible to store twice voltage in a series of actions, as compared to the case of the full-wave rectification. Thus, it is possible to operate subsequent-stage circuits of the power storage circuit 12 at a high voltage, and therefore, improve the efficiency of the subsequent-stage circuits. On the other hand, according to the full-wave rectification, substantially the same voltage is generated regardless whether the door is opened or closed, and therefore, it is not possible to increase the stored energy even if increasing duration of generation twice.

The capacitors C1 to C4 are, for example, electrolytic capacitors.

The output terminals of the power generators M1 and M2 are cascaded with each other. For supporting a heavy movable object 22, typically, a plurality of hinge devices are used. When using two hinge devices, each of these hinge devices may be provided with a power generating device. By cascading the capacitors C1 to C4 that are charged by voltages generated by the power generators M1 and M2 of the power generating devices, the sum of voltages across the capacitors C1 to C4 is obtained as the output voltage. Thus, it is possible to operate the subsequent-stage circuits of the power storage circuit 12 at a high voltage, and therefore, improve the efficiency of the subsequent-stage circuits.

In the controller circuit 13, the capacitors C5 to C7, the diode D5, the resistors R1 to R6, the transformer T1, and the transistors TR2 to TR5 constitute an inverter circuit 13*a*. The inverter circuit 13a operates in a voltage-resonant mode, and performs soft switching (zero volt switching). In addition, the capacitor C5, the resistor R1, the variable resistor VR1, and the transistors TR1 to TR3 constitute a voltage setting circuit 13b. The voltage setting circuit 13b sets a voltage range in which the power system operates, by the variable resistor VR1 and the transistor TR1, in particular, sets a lower limit voltage of the output voltage of the power storage circuit 12. The controller circuit 13 stops supplying electric power from the power storage circuit 12 to the load device (light emitting diode 14a), when the voltage across the capacitors C1 to C4 of the power storage circuit 12 is equal to or lower than the lower limit voltage set by the voltage setting circuit 13b. In addition, the capacitors C5 and C7, the resistors R1 to R3, R5, and R6, the transformer T1, and the transistors TR2, TR3, and TR5 constitute a constant-current controller circuit 13c. The constant-current controller circuit 13c supplies a constant current from the power storage circuit 12 to the load device (light emitting diode 14a).

In general, when charging a capacitor from a completely empty state, it is charged at a theoretical efficiency of 50%. Further, when operating the load device while not generating electric power, the capacitors should store the minimum energy corresponding to electric power required to operate the load device. In addition, when operating the load device, the minimum voltage is needed enough to activate the transistors and the like of the controller circuit. For these reasons, the controller circuit 13 sets the lower limit voltage for the power storage circuit 12. For example, assuming that generated voltage (induced electromotive force, speed electromotive force) per one power generator M1 is 12 (V). In this case, when the voltage $V_1$ across the capacitor C1 (with capacitance $C_1=0.01$ F) reaches 10 V after generating electric power for one second, the energy of the capacitor C1 is: $½ \times C_1 \times V_1^2 = 0.5$ (J). Thereafter, when the controller circuit 13 operates the load device 14, and the voltage of the capacitor C1 decreases to the minimum voltage $V_{O1}$ (in this case, assuming 1.5 (V)), the remaining energy of the capacitor C1 is: $½ \times C_1 \times V_{O1}^2 = 0.011$ (J). Accordingly, the available energy is about 0.49 (J). Thus, by setting the lower limit voltage, it is possible to fully utilize the energy of the capacitors C1 to C4, and reliably operate the load device 14.

The light emitting diode 14a can achieve the same illumination effect as that of an incandescent lamp and a fluorescent lamp, with smaller energy and a smaller device as compared with those of an incandescent lamp and a fluorescent lamp. Accordingly, the light emitting diode 14a is suitable for effectively utilizing limited energy in the power system according to the embodiment of the present disclosure. In addition, in the case of using the light emitting diode 14a as the load device, when opening and closing a door of a gate, an entrance, a corridor, or the like, at night, it is possible to obtain an auxiliary illumination effect with brightness enough to guide around the door (e.g., around the feet), for safe and assured movement at night. In addition, in the case of using the light emitting diode 14a as the load device, when a suspicious person tries to enter by opening and closing the door, it is possible to warn the suspicious person and/or prevent his/her entry, in a manner similar to that of a sensor light. In addition, in the case of using the light emitting diode 14a as the load device, when opening and closing a door of a cabinet or warehouse (e.g., a cabinet under a washbasin, or outdoor warehouse) not connected to a commercial power source, it is convenient to visually recognize the inside of the cabinet or warehouse for a certain period of time.

In the present disclosure, the light emitting diode 14a is also referred to as an "lighting device".

In addition, the wireless transmitter 14b1 and the wireless receiver 14b2 can be used to achieve a watching function for monitoring living activities of an elderly person or the like. For example, in a case of using the wireless transmitter 14b1 as the load device, by incorporating the hinge device into a toilet door, it is possible to notify a predetermined person of information, such as the number of times by which a toilet is used, via wireless communication. In particular, this is effective in watching in a case where an elderly person and their family live apart. In addition, in a case of using the wireless transmitter 14b1 as the load device, when a suspicious person tries to enter by opening and closing a door of, e.g., a gate and/or entrance, it is possible to notify a predetermined person of the entry via wireless communication, for assurance.

The power system according to the embodiment of the present disclosure may be provided with a player device for voice guidance, a camera for capturing digital images, and the like, as components corresponding to the load device 14 of FIG. 1.

The power system according to the first embodiment may be provided with three or more power generating devices.

In the present disclosure, the wireless transmitter 14b1 is also referred to as a "communication device". The power system according to the embodiment, of the present disclosure may be provided with a wired communication device, instead of and/or in addition to the wireless transmitter.

Figure 11:
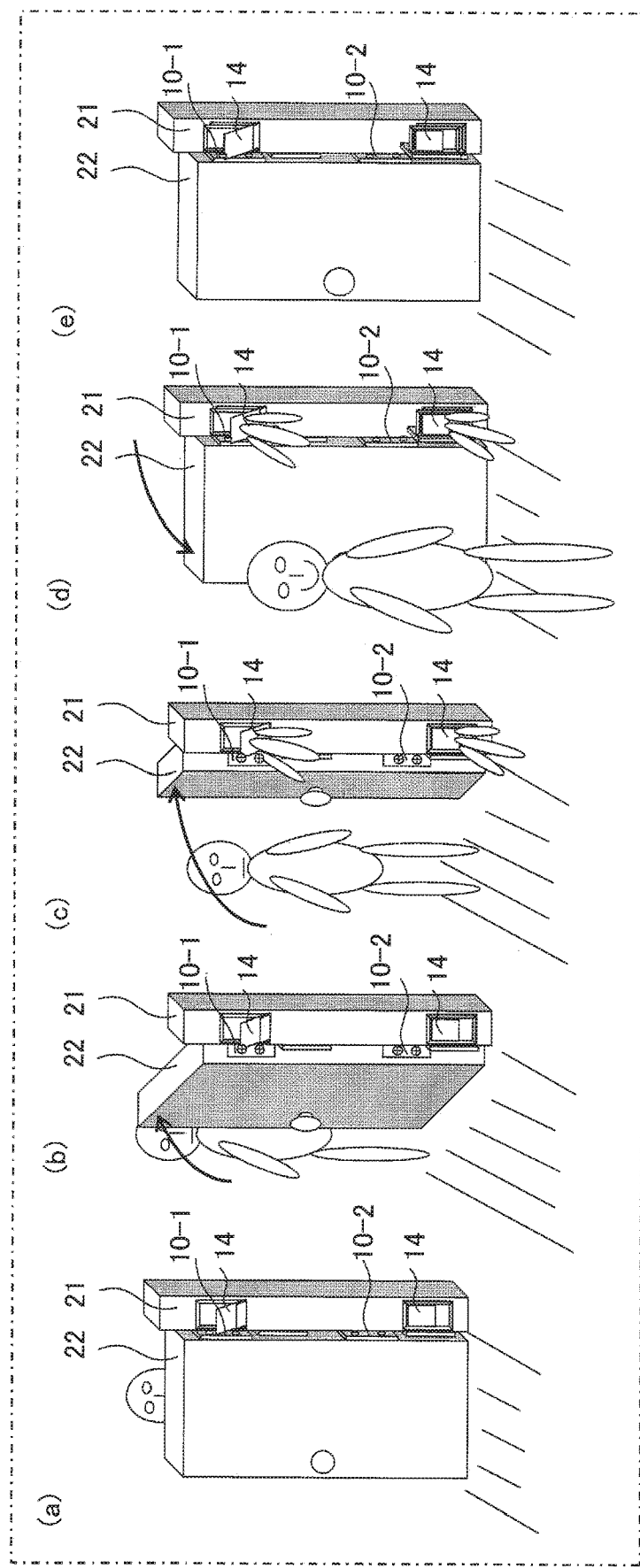
FIG. 11 is a schematic diagram illustrating operation of the power system according to the first embodiment.

FIG. 11 is a schematic diagram illustrating operation of the power system according to the first embodiment. FIG. 11 illustrates a scene of generation of electric power from energy obtained from a user's living activities, and utilization of the generated electric power. As shown in FIG. 11(a), for example, at night or in a dark place, the user pulls a handle (door knob) of the movable object 22 to open a door. As shown in FIGS. 11(b) to 11(c), while the movable object 22 is moving to open the door, the power generating devices of the hinge devices 10-1 and 10-2 generate electric power, and store the energy of the generated electric power in the power storage circuit 12 (not shown in FIG. 11). In addition, as shown in FIG. 11(d), also while the movable object 22 is moving to close the door, the power generating devices of the hinge devices 10-1 and 10-2 generate electric power, and store the energy of the generated electric power in the power storage circuit 12. As shown in FIG. 11(c), for example, 0.5 seconds after the user started to open the door (that is, started to generate electric power), the controller circuit 13 (not shown in FIG. 11) supplies the energy of the power storage circuit 12 to the load device 14, and turns on the load device 14 (lighting device). As shown in FIG. 11(d), when the user closes the door and moves forward, the controller circuit 13 supplies the energy of the power storage circuit 12 to the load device 14, thus lighting the forward and guiding the user's feet. The load device 14 is kept lighting while the user is moving, e.g., for five seconds, and the user arrives at the destination (e.g., the next door). As shown in FIG. 11(e), for example, five seconds after starting to open the door, the controller circuit 13 turns off the load device 14.

The controller circuit 13 may supply electric power from the power storage circuit 12 to the load device 14, simultaneously with the power generating action of the power generating device 3. In addition, the controller circuit 13 may supply electric power from the power storage circuit 12 to the load device 14, after a predetermined time has elapsed from the power generating action of the power generating device 3. In addition, the controller circuit 13 may supply electric power from the power storage circuit 12 to the load device 14, independently of the power generating action of the power generating device 3. Accordingly, it is convenient and assured to operate the load device 14 at any moment, including during, after, and before operation of the power generating device 3.

As described above, according to the power system of the first embodiment, since the power generating device 3 is incorporated into the hinge device 10, it is possible to efficiently extract energy from the user's living activities to generate electric power.

Figure 12:
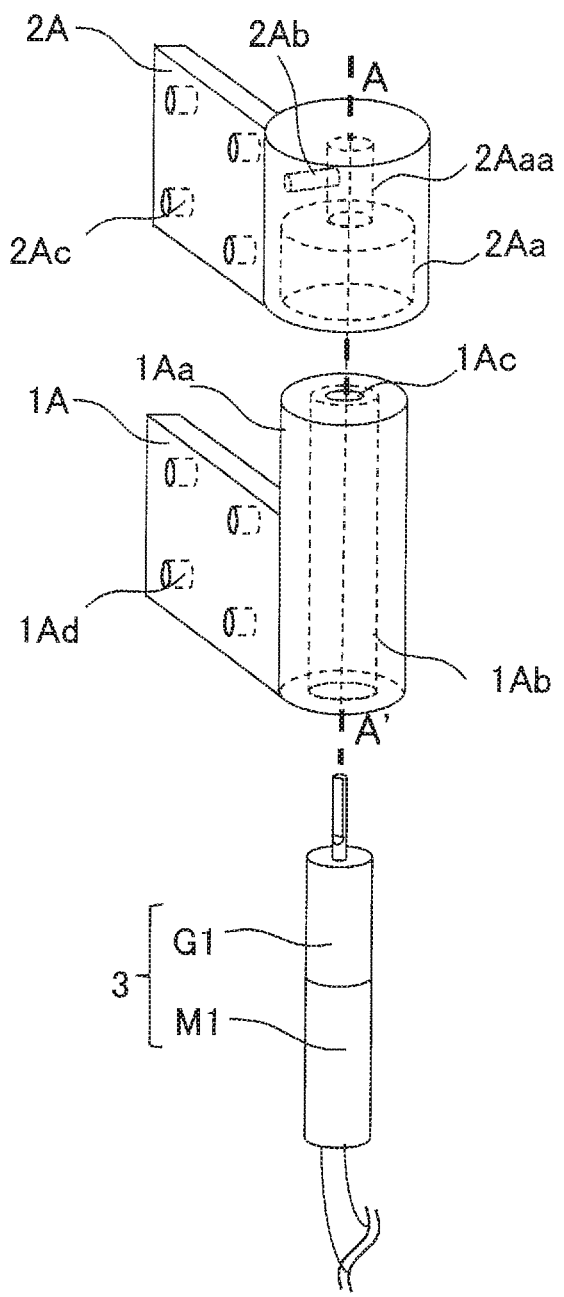
FIG. 12 is a perspective view illustrating a first step of assembling a hinge device 10A of a power system according to a first modified embodiment of the first embodiment.
Figure 13:
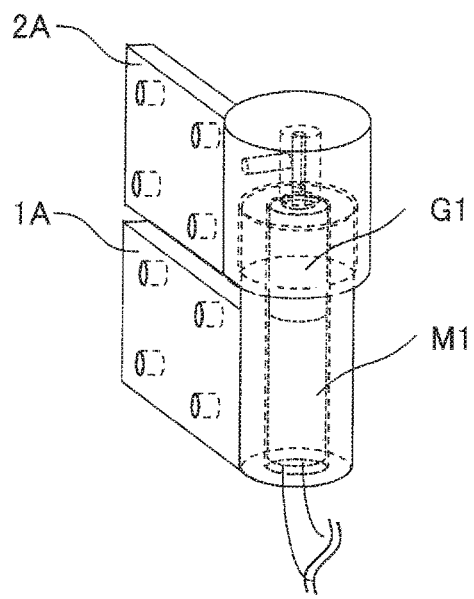
FIG. 13 is a perspective view illustrating a second step of assembling the hinge device 10A of the power system according to the first modified embodiment of the first embodiment.
Figure 14:
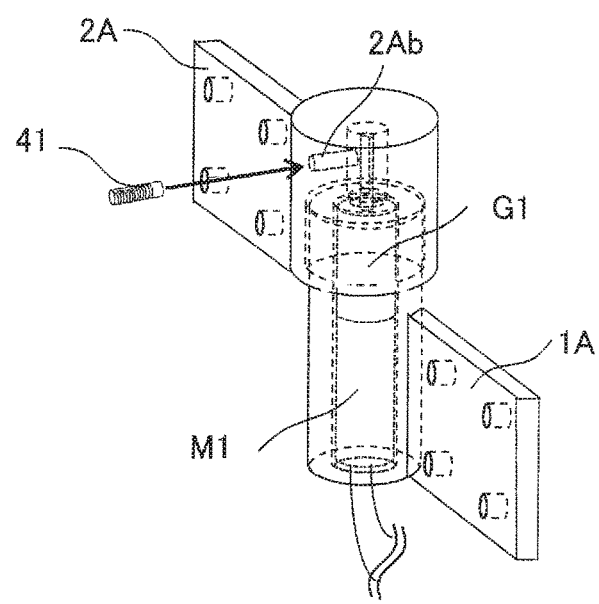
FIG. 14 is a perspective view illustrating a third step of assembling the hinge device 10A of the power system according to the first modified embodiment of the first embodiment.
Figure 15:
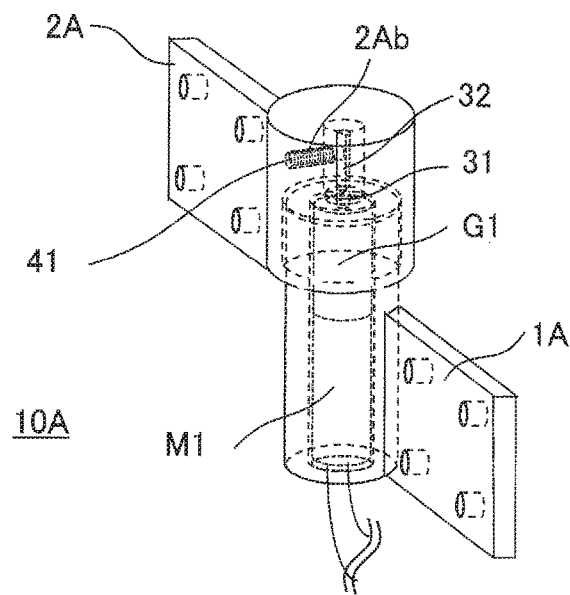
FIG. 15 is a perspective view illustrating a fourth step of assembling the hinge device 10A of the power system according to the first modified embodiment of the first embodiment.

FIGS. 12 to 15 are perspective views illustrating the first to fourth steps of assembling a hinge device 10A of a power system according to a first modified embodiment of the first embodiment. The shape of the hinge component of the hinge device is not limited to that of FIGS. 3 to 6. As shown in FIG. 12, a hinge component 1A has a protrusion 1Aa, a recess 1Ab, a through hole like, and a screw hole 1Ad corresponding to the protrusion 1a, the recess 1b, the through hole 1c, and the screw hole 1d of the hinge component 1 of FIG. 3, respectively. A hinge component 2A has recesses 2Aa and 2Aaa, a screw hole 2Ab, and a screw hole 2Ac corresponding to the recess 2a, the screw hole 2b, and the screw hole 2c of the hinge component 2 of FIG. 3, respectively. A cylindrical portion of the hinge component 2A has the two recesses 2Aa and 2Aaa with different inner diameters. Thus, the weight of the hinge component 2A is applied to the hinge component 1A, at a position where the top of the cylindrical portion of the hinge component 1A is in contact with the top of the recess 2Aa of the hinge component 2A. The screw hole 2Ab penetrates the hinge component 2A from the outside of the hinge component 2A to the recess 2Aaa. As shown in FIGS. 13 to 15, the subsequent assembly of the hinge device 10A is similar to the assembly of the hinge device 10 described with reference to FIGS. 4 to 6.

Figure 16:
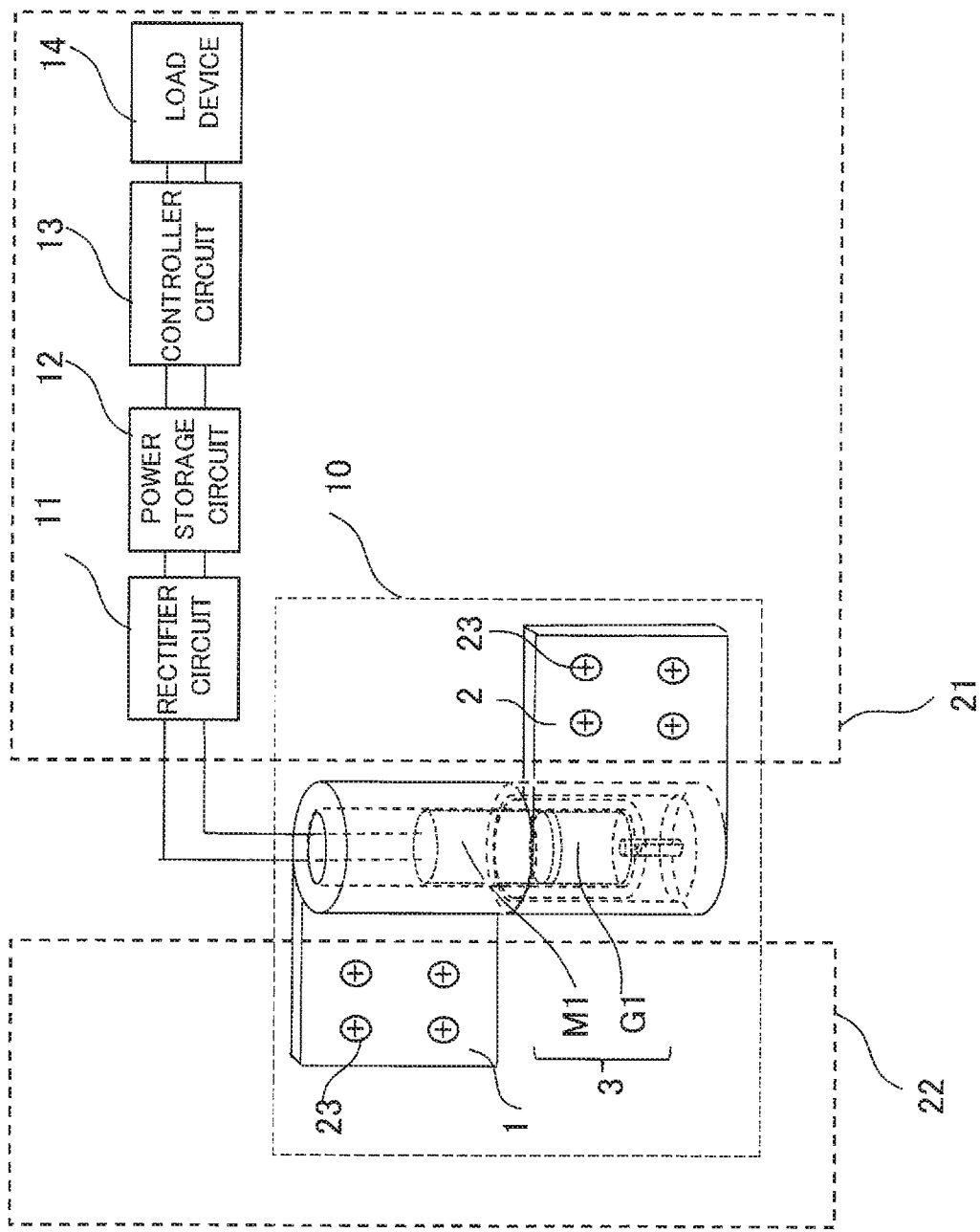
FIG. 16 is a schematic diagram illustrating a configuration of a power system according to a second modified embodiment of the first embodiment.

FIG. 16 is a schematic diagram illustrating a configuration of a power system according to a second modified embodiment of the first embodiment. Although the hinge device 10 of FIG. 16 is configured in a manner similar to that of the hinge device 10 of FIG. 1, the hinge component 1, to which the housing 30 of the power generating device 3 is fixed, is disposed above the hinge component 2, to which the input shaft 31 of the power generating device 3 is restrained, and the hinge component 2 supports the hinge component 1. Thus, the hinge component 2 may support the hinge component 1, instead of supporting the hinge component 2 by the hinge component 1. In addition, the hinge component 1, to which the housing 30 of the power generating device 3 is fixed, may be fixed to the movable object 22, and the hinge component 2, to which the input shaft 31 of the power generating device 3 is restrained, may be fixed to the stationary object 21.

Figure 17:
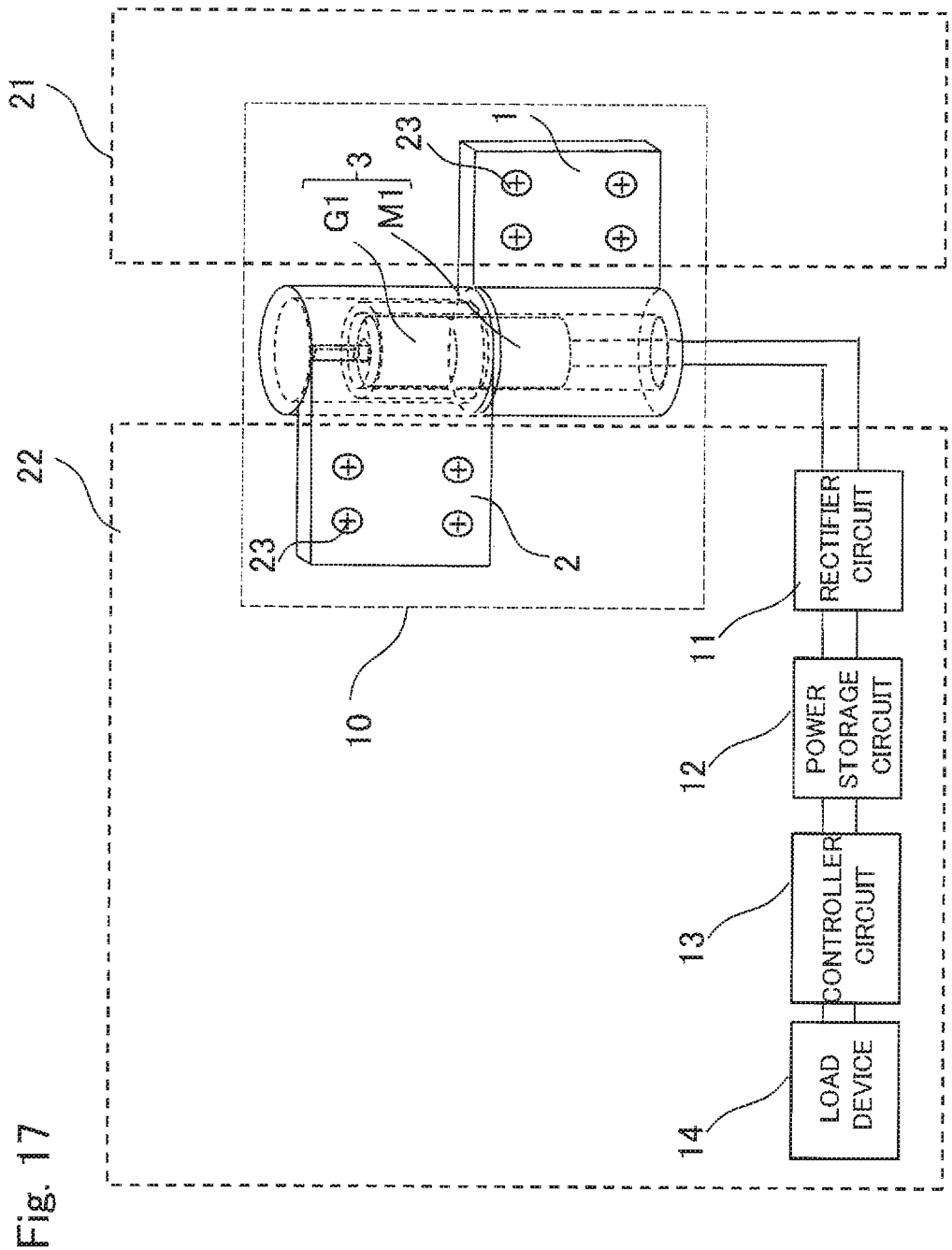
FIG. 17 is a schematic diagram illustrating a configuration of a power system according to a third modified embodiment of the first embodiment.

FIG. 17 is a schematic diagram illustrating a configuration of a power system according to a third modified embodiment of the first embodiment. The rectifier circuit 11, the power storage circuit 12, the controller circuit 13, and the load device 14 may be disposed on the movable object 22, as shown in FIG. 17.

Figure 18:
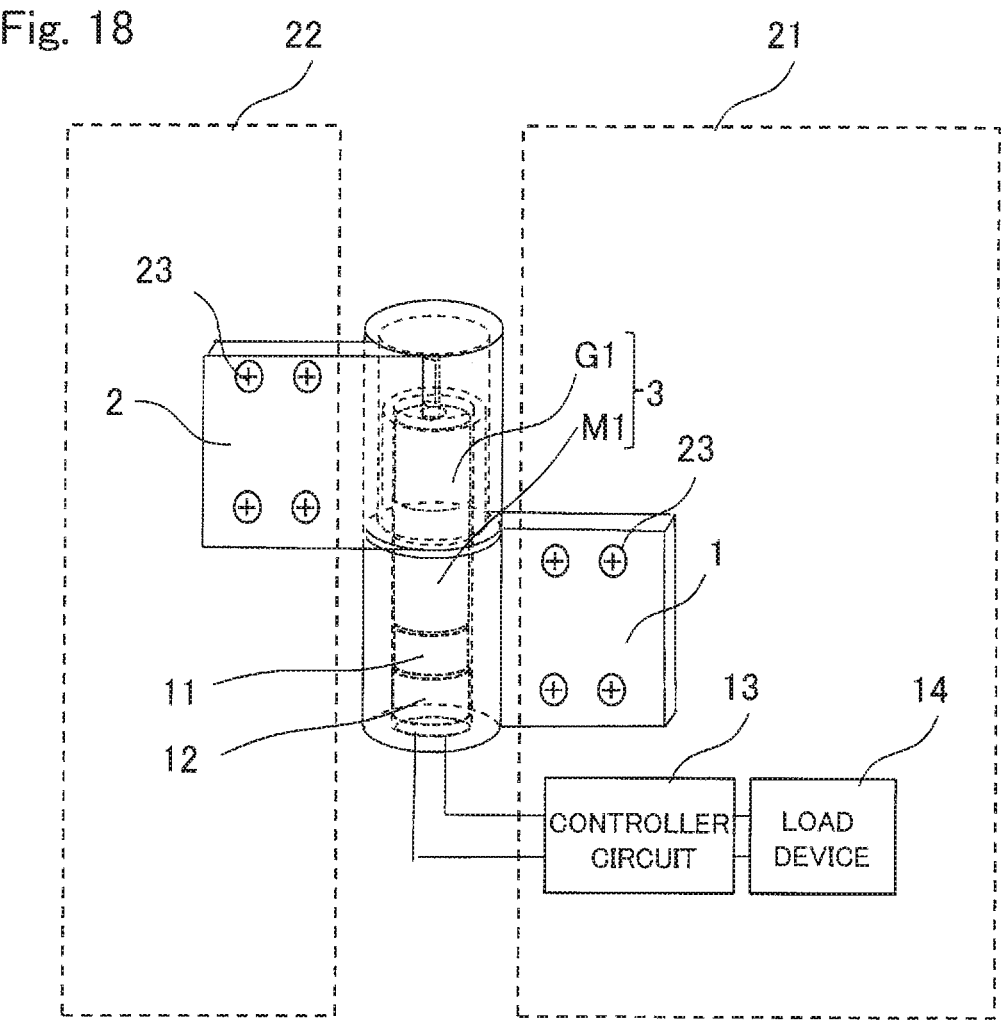
FIG. 18 is a schematic diagram illustrating a configuration of a power system according to a fourth modified embodiment of the first embodiment.

FIG. 18 is a schematic diagram illustrating a configuration of a power system according to a fourth modified embodiment of the first embodiment. At least one of the rectifier circuit 11, the power storage circuit 12, and the controller circuit 13 may be disposed on the hinge component 1, together with the power generating device 3. In the example of FIG. 18, the rectifier circuit 11 and the power storage circuit 12 are provided in the recess (hollow) of the hinge component 1, together with the power generating device 3, and the controller circuit 13 and the load device 14 are disposed on the stationary object 21. According to the configuration of FIG. 18, it is possible to simplify and improve the appearance of the power system.

Figure 19:
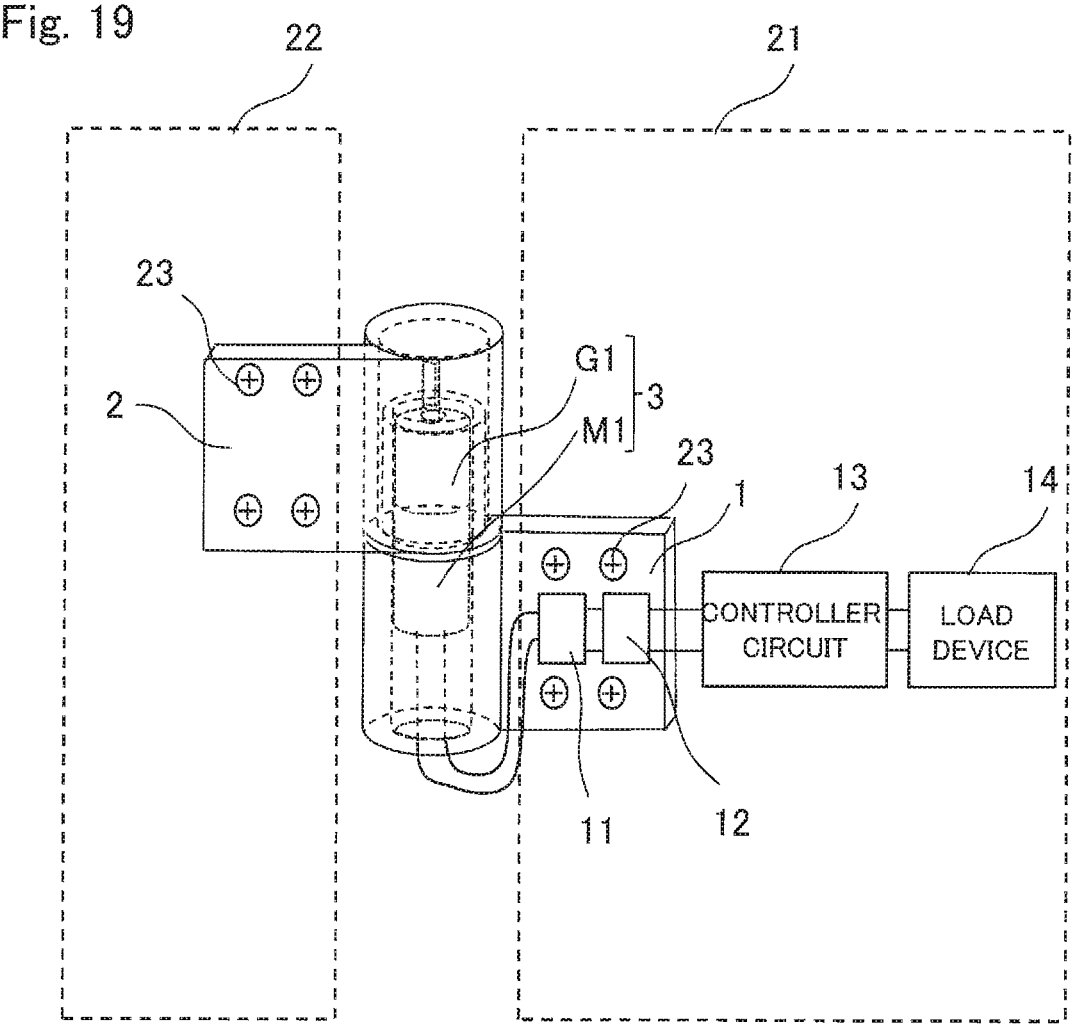
FIG. 19 is a schematic diagram illustrating a configuration of a power system according to a fifth modified embodiment of the first embodiment.

FIG. 19 is a schematic diagram illustrating a configuration of a power system according to a fifth modified embodiment of the first embodiment. At least one of the rectifier circuit 11, the power storage circuit 12, and the controller circuit 13 is not necessarily disposed in the recess of the hinge component 1, and may be disposed at other positions on the hinge component 1. In the example of FIG. 19, the rectifier circuit 11 and the power storage circuit 12 are provided on the hinge component 1, and the controller circuit 13 and the load device 14 are disposed on the stationary object 21. Even when the circuit components can not be disposed inside the hinge component 1, the circuit components can be provided at any other locations in accordance with the user's usage and the appearance.

Figure 20:
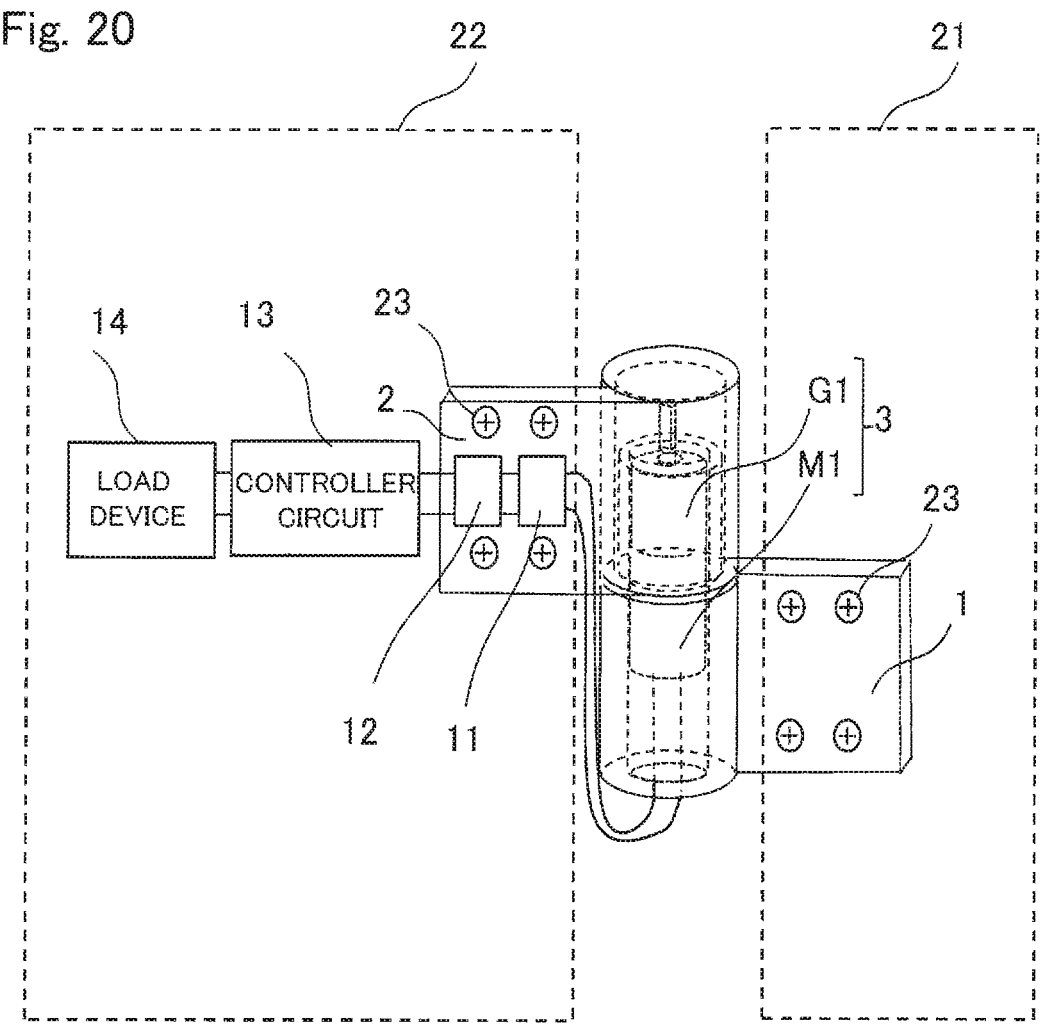
FIG. 20 is a schematic diagram illustrating a configuration of a power system according to a sixth modified embodiment of the first embodiment.

FIG. 20 is a schematic diagram illustrating a configuration of a power system according to a sixth modified embodiment of the first embodiment. At least one of the rectifier circuit 11, the power storage circuit 12, and the controller circuit 13 may be disposed on the hinge component 2. In the example of FIG. 20, the rectifier circuit 11 and the power storage circuit 12 are provided on the hinge component 2, and the controller circuit 13 and the load device 14 are disposed on the movable object 22. The hinge component 2 may be provided with a recess (hollow), and at least one of the rectifier circuit 11, the power storage circuit 12, and the controller circuit 13 may be provided in the recess. Thus, the rectifier circuit 11, the power storage circuit 12, the controller circuit 13, and the load device 14 can be disposed at desired locations in accordance with the user's usage and the appearance.

The hinge device and the power system according to the first embodiment are characterized by the following configurations.

According to the hinge device of the first embodiment, the hinge device 10 is provided with: the first hinge component 1 and the second hinge component 2 having the common reference axis, and the power generating device 3. The first hinge component 1 and the second hinge component 2 are engaged with each other, so as to be rotatable about the reference axis relative to each other, and so that one of the first hinge component 1 and the second hinge component 2 supports the other. The power generating device 3 is provided with the housing 30 and the input shaft 31, and generates electric power by rotation of the input shaft 31. The housing 30 of the power generating device 3 is fixed to the first hinge component 1, so that the input shaft 31 of the power generating device 3 is positioned on the reference axis. The input shaft 31 of the power generating device 3 is restrained to the second hinge component 2 with respect to the direction of rotation about the reference axis, so that the input shaft 31 of the power generating device 3 rotates by as much as rotation of the second hinge component 2 when the second hinge component 2 rotates about the reference axis.

As a result, it is possible to provide the hinge device 10 provided with the power generating device 3, the hinge device 10 being capable of efficiently extracting energy from the user's living activities to generate electric power.

According to the hinge device of the first embodiment, the first hinge component 1 may be provided with the through hole 1c at the position where the first hinge component 1 and the second hinge component 2 are engaged with each other, the through hole 1c being formed so that the input shaft 31 of the power generating device 3 protrudes from the first hinge component 1 toward the second hinge component 2. The second hinge component 2 is formed to have the recess 2a at the position where the first hinge component 1 and the second hinge component 2 are engaged with each other, the recess 2a accommodating the input shaft 31 of the power generating device 3 protruding through the through hole 1c.

As a result, by protruding the input shaft 31 of the power generating device 3 from the through hole 1c so as to be accommodated in the recess 2a, the power generating device 3 can be incorporated in the hinge device 10, so that rotation of the hinge component 2 is transmitted to the power generating device 3 fixed to the first hinge component 1.

According to the hinge device of the first embodiment, the input shaft 31 of the power generating device 3 may have the dent 32 on the side surface of the input shaft 31. The input shaft 31 of the power generating device 3 is restrained to the second hinge component 2 with respect to the direction of rotation about the reference axis, by the screw 41 extending from the outside of the second hinge component 2 to the recess 2a so as to penetrate the second hinge component 2 and contact with the dent 32 in the recess 2a.

As a result, the input shaft 31 of the power generating device 3 rotates by as much as rotation of the second hinge component 2, when the second hinge component 2 rotates about the reference axis. The screw 41 does not have to restrain the input shaft 31 of the power generating device 3 to the hinge component 2 with respect to the longitudinal direction of the reference axis. Accordingly, since the weight of the hinge component 2 is not applied to the power generating device 3 when the hinge component 1 supports the hinge component 2, it is possible to reliably operate the power generating device 3, without applying an extra mechanical load to the power generating device 3.

According to the hinge device of the first embodiment, the first hinge component 1 and the second hinge component 2 may be engaged with each other so as to be detachable from each other.

As a result, using the hinge device 10, it is possible to easily build, for example, a door including the stationary object 21 and the movable object 22.

According to the hinge device of the first embodiment, the power generating device 3 may be provided with: the gear mechanism G1 that transmits rotation of the input shaft 31 of the power generating device 3 at the increasing gear ratio, and the power generator M1 that generates electric power by rotation transmitted by the gear mechanism G1.

As a result, it is possible to efficiently generate electric power from energy obtained from the user's living activities, using the gear mechanism G1.

According to the power system of the first embodiment, the power system is provided with the hinge device 10, the rectifier circuit 11, the power storage circuit 12, the controller circuit 13, and the load device 14. The rectifier circuit 11 rectifies the electric power generated by the power generating device 3 of the hinge device 10. The power storage circuit 12 stores the energy of electric power rectified by the rectifier circuit 11. The controller circuit 13 controls discharging of the power storage circuit 12. The load device 14 consumes electric power of the power storage circuit 12 under control of the controller circuit 13.

As a result, using the rectifier circuit 11, the power storage circuit 12, the controller circuit 13, and the load device 14, it is possible to effectively utilize electric power generated from energy obtained from the user's living activities, according to usage of the load device 14.

According to the power system of the first embodiment, the power generating device 3, and at least one of the rectifier circuit 11, the power storage circuit 12, and the controller circuit 13 may be provided on the first hinge component 1 of the hinge device 10.

As a result, it is possible to freely arrange the components of the power system.

According to the power system of the first embodiment, at least one of the rectifier circuit 11, the power storage circuit 12, and the controller circuit 13 may be disposed on the second hinge component 2 of the hinge device 10.

As a result, it is possible to freely arrange the components of the power system.

According to the power system of the first embodiment, one of the first hinge component 1 and the second hinge component 2 of the hinge device 10 may be fixed to the stationary object 21, and the other may be fixed to the movable object 22. The weight of the movable object 22 is supported by the first hinge component 1 and the second hinge component 2, and the stationary object 21. When the movable object 22 rotates with respect to the stationary object 21 about the reference axis of the hinge device 10, the power generating device 3 generates electric power by rotation of the input shaft 31.

As a result, since the weight of the hinge component 2 and the movable object 22 is not applied to the power generating device 3, it is possible to reliably operate the power generating device 3, without applying an extra mechanical load to the power generating device 3.

According to the power system of the first embodiment, at least one of the rectifier circuit 11, the power storage circuit 12, and the controller circuit 13 may be disposed on the stationary object 21.

As a result, it is possible to freely arrange the components of the power system.

According to the power system of the first embodiment, at least one of the rectifier circuit 11, the power storage circuit 12, and the controller circuit 13 may be disposed on the movable object 22.

As a result, it is possible to freely arrange the components of the power system.

According to the power system of the first embodiment, the power generation system may be provided with the plurality of power generating devices 3 cascaded with each other.

As a result, it is possible to generate a higher voltage or a larger current, as compared with a case where a single power generating device 3 is provided.

According to the power system of the first embodiment, the power storage circuit 12 may include the plurality of capacitors C1 to C4. The rectifier circuit 11 includes the voltage-doubling rectifier circuit.

As a result, it is possible to store twice voltage in a series of actions, as compared to the case of the full-wave rectification. Accordingly, it is possible to operate the subsequent-stage circuits of the power storage circuit 12 at a high voltage, and therefore, improve the efficiency of the subsequent-stage circuits.

According to the power system of the first embodiment, the controller circuit 13 may supply electric power from the power storage circuit 12 to the load device 14, simultaneously with power generating action of the power generating device 3, or after the predetermined time has elapsed from the power generating action of the power generating device 3, or independently of the power generating action of the power generating device 3.

As a result, it is possible to operate the load device 14 at any moment, including during, after, and before operation of the power generating device 3. Accordingly, it is possible to effectively utilize electric power generated from energy obtained from the user's living activities, according to usage of the load device 14.

According to the power system of the first embodiment, the controller circuit 13 may stop supplying electric power from the power storage circuit 12 to the load device 14, when the voltage across the capacitors C1 to C4 of the power storage circuit 12 is equal to or lower than the predetermined lower limit voltage.

As a result, it is possible to fully utilize the energy of the capacitors C1 to C4, and reliably operate the load device 14.

According to the power system of the first embodiment, the load device 14 may include a lighting device.

As a result, the power system including the lighting device can be utilized for purposes of, e.g., lighting, warning to a suspicious person, and/or prevention of entry of a suspicious person.

According to the power system of the first embodiment, the load device 14 may include the communication device.

As a result, the power system including the communication device can be utilized for purposes of, e.g., watching an elderly person and/or notification of a suspicious person.

The hinge device according to the first embodiment can be applied to any structure using the hinge device, such as doors, windows, gates, or lids. All the above-described advantageous effects can be obtained in the opening/closing action of gates, revolving doors, and single doors of general households, public facilities, or the like.

Second Embodiment

The shapes of hinge components of a hinge device are not limited to those shown in FIGS. 3 to 6, and FIGS. 12 to 15. Hereinafter, hinge devices of power systems according to a second embodiment will be described.

Figure 21:
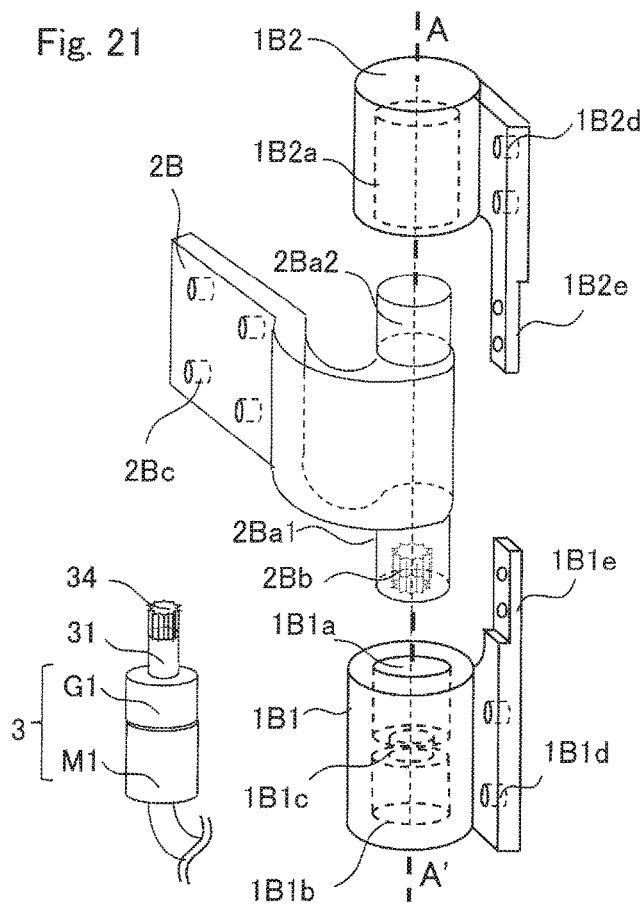
FIG. 21 is a perspective view illustrating a first step of assembling a hinge device 10B of a power system according to a second embodiment.
Figure 22:
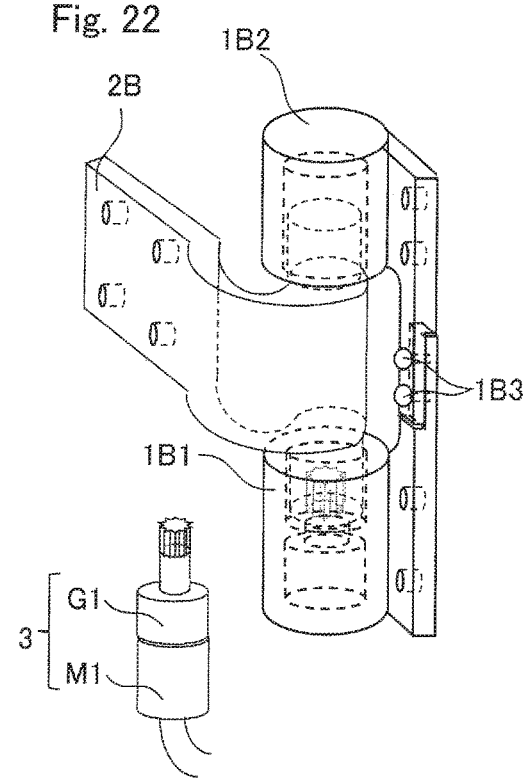
FIG. 22 is a perspective view illustrating a second step of assembling the hinge device 10B of the power system according to the second embodiment.
Figure 23:
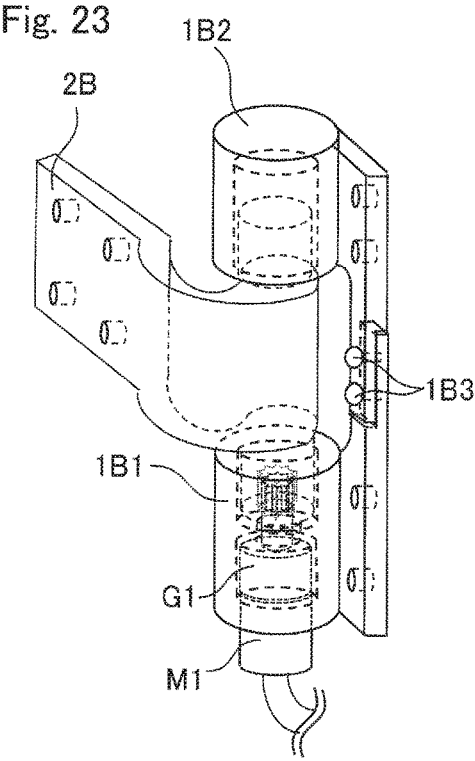
FIG. 23 is a perspective view illustrating a third step of assembling the hinge device 10B of the power system according to the second embodiment.

FIGS. 21 to 23 are perspective views illustrating first to third steps of assembling a hinge device 10B of a power system according to the second embodiment. The hinge device 10B is provided with a hinge component 1B1, a hinge component 1B2, a hinge component 2B, and a power generating device 3.

As shown in FIG. 21, the hinge component 1B1 has a cylindrical portion and a planar portion coupled to each other. The cylindrical portion of the hinge component 1B1 has: a recess 1B1a to be engaged with the hinge component 2B, and a recess 1B1b accommodating the power generating device 3. The cylindrical portion of the hinge component 1B1 is further provided with a through hole 1B1c at a position where the hinge component 1B1 and the hinge component 2B are engaged with each other, the through hole 1B1c being formed so that the input shaft 31 of the power generating device 3 protrudes from the hinge component 1B1 toward the hinge component 2B. The planar portion of the hinge component 1B1 has: a plurality of screw holes 1B1d for fixing the hinge component 1B1 to a stationary object with a plurality of screws, and a coupling portion 131e including screw holes for coupling the hinge components 1B1 and 1B2 to each other. The hinge component 1B2 also has a cylindrical portion and a planar portion coupled to each other. The cylindrical portion of the hinge component 1B2 has a recess 1B2a to be engaged with the hinge component 2B. The planar portion of the hinge component 1B2 has: a plurality of screw holes 1B2d for fixing the hinge component 1B2 to the stationary object with a plurality of screws, and a coupling portion 1B2e including screw holes for coupling the hinge components 1B1 and 1B2 to each other. The hinge component 2B also has a cylindrical portion and a planar portion coupled to each other. The cylindrical portion of the hinge component 2B has a first end (lower end in FIG. 21) and a second end (upper end in FIG. 21) along a reference axis (indicated by line A-A' in FIG. 21). The cylindrical portion of the hinge component 2B has: a protrusion 2Ba1 at the first end to be engaged with the recess 1B1a of the hinge component 1B1, and a protrusion 2Ba2 at the second end to be engaged with the recess 1B2a of the hinge component 1B2. The cylindrical portion of the hinge component 2B has a recess 2Bb at the first end to be engaged with the input shaft 31 of the power generating device 3. The planar portion of the hinge component 2B has a plurality of screw holes 2Bc for fixing the hinge component 2B to a movable object with a plurality of screws.

The input shaft 31 of the power generating device 3 has a protrusion 34 of some shape at a tip thereof, instead of the dent 32 of FIG. 2, so that the input shaft 31 is restrained to the hinge component 2B with respect to the direction of rotation about the reference axis. In the example of FIG. 21, the input shaft 31 of the power generating device 3 has a gear-shaped protrusion 34. The recess 2Bb of the hinge component 2B is shaped complementary to the protrusion 34 of the power generating device 3 as seen from a point on the reference axis.

As shown in FIG. 22, the hinge components 1B1 and 1B2 and the hinge component 2B are engaged with each other, so as to be rotatable about a common reference axis relative to each other, and so that one of the hinge components 1B1 and 1B2 and the hinge component 2B supports the other. Since the recess 1B1a of the hinge component 1B1 has an inner cylindrical surface, and the protrusion 2Ba1 of the hinge component 2B has an outer cylindrical surface, the hinge component 1B1 and the hinge component 2B are engaged with each other so as to be rotatable relative to each other. Similarly, since the recess 1B2a of the hinge component 1B2 has an inner cylindrical surface, and the protrusion 2Ba2 of the hinge component 2B has an outer cylindrical surface, the hinge component 1B2 and the hinge component 2B are engaged with each other so as to be rotatable relative to each other. In addition, in the example of FIG. 22, the hinge component 2B is disposed between the hinge components 1B1 and 1B2, and the hinge components 1B1 and 1B2 support the hinge component 2B. The hinge components 1B1 and 1B2 are coupled to each other at the coupling portions 1B1e and 1B2e with screws 1B3.

Except for the position where the hinge components 1B1 and 1B2 and the hinge component 2B are engaged with each other so as to be rotatable relative to each other (i.e., the recess 1B1a of the hinge component 1B1, the recess 1B2a of the hinge component 1B2, and the protrusions 2Ba1 and 2Ba2 of the hinge component 2B), the outer surfaces of the hinge components 1B1 and 1B2 and the hinge component 2B may not be cylindrically shaped, but may be shaped as triangular prisms, quadrangular prisms, other polygonal prisms, other polyhedrons.

As shown in FIG. 23, the power generating device 3 is inserted into the recess 1B1b of the hinge component 1B1. The housing 30 of the power generating device 3 is fixed to the hinge component 1B1 with an adhesive, a screw (not shown) or the like, so that the input shaft 31 of the power generating device 3 is positioned on the reference axis. The recess 2Bb of the hinge component 2B accommodates the protrusion 34 at the tip of the input shaft 31 of the power generating device 3, the protrusion 34 protruding through the through hole 1B1c. Since the protrusion 34 of the power generating device 3 and the recess 2Bb of the hinge component 2B are shaped complementary to each other, the input shaft 31 of the power generating device 3 is restrained to the hinge component 2B with respect to the direction of rotation about the reference axis. Accordingly, when the hinge component 2B rotates about the reference axis, the input shaft 31 of the power generating device 3 rotates by as much as rotation of the hinge component 2B.

The hinge device 10B is made by engaging the hinge components 1B1 and 1B2 and the hinge component 2B with each other, fixing the housing 30 of the power generating device 3 to the hinge component 1B1, restraining the input shaft 31 of the power generating device 3 to the hinge component 2B, and coupling the hinge components 1B1 and 1B2 to each other with a screw 1B3.

Since the hinge device 10B is configured as shown in FIGS. 21 to 23, the power generating device 3 is incorporated in the hinge device 10B. In the hinge device 10B, the input shaft 31 of the power generating device 3 protrudes from the through hole 1B1c, and the input shaft 31 of the power generating device 3 is restrained to the hinge component 2B by the protrusion 34 of the power generating device 3 and the recess 2Bb of the hinge component 2B, being shaped complementary to each other. Accordingly, rotation of the hinge component 2B can be transmitted to the power generating device 3 accommodated in the recess 1B1b of the hinge component 1B1. Thus, it is possible to achieve such a configuration that the power generating device 3 is incorporated in the hinge device 10B. Since the power generating device 3 is incorporated in the hinge device 10B, it is possible to provide the hinge device 10B having a good appearance.

In addition, since the hinge components 1B1 and 1B2 support the hinge component 2B, the weight of the hinge component 2B is not applied to the power generating device 3. The protrusion 34 of the power generating device 3 and the recess 2Bb of the hinge component 2B, being shaped complementary to each other, do not have to restrain the input shaft 31 of the power generating device 3 to the hinge component 2B with respect to the longitudinal direction of the reference axis, but restrain the input shaft 31 to the hinge component 2B with respect to at least the direction of rotational about the reference axis. Accordingly, it is possible to achieve such a configuration that the weight of the hinge component 2B (and a movable object 22 described below) is not applied to the power generating device 3, while the input shaft 31 of the power generating device 3 protrudes from the through hole 1B1c, and the input shaft 31 of the power generating device 3 is restrained to the hinge component 2B by the protrusion 34 of the power generating device 3 and the recess 2Bb of the hinge component 2B, being shaped complementary to each other. Since the weight of the hinge component 2B (and the movable object 22B) is not applied to the power generating device 3, it is possible to reliably operate the power generating device 3, without applying an extra mechanical load to the power generating device 3.

In addition, the hinge components 1B1 and 1B2 and the hinge component 2B having the configurations of FIGS. 21 to 23 are integrally configured so as to be rotatable with respect to each other. Accordingly, using the hinge device 10B, it is possible to easily build a door including a stationary object and a movable object.

In the present disclosure, the hinge components 1B1 and 1B2 are also referred to as "first hinge component", and the hinge component 2B is also referred to as a "second hinge component". In addition, in the present disclosure, the hinge component 1B1 is also referred to as a "first portion of the first hinge component", and the hinge component 1B2 is also referred to as a "second portion of the first hinge component".

Figure 24:
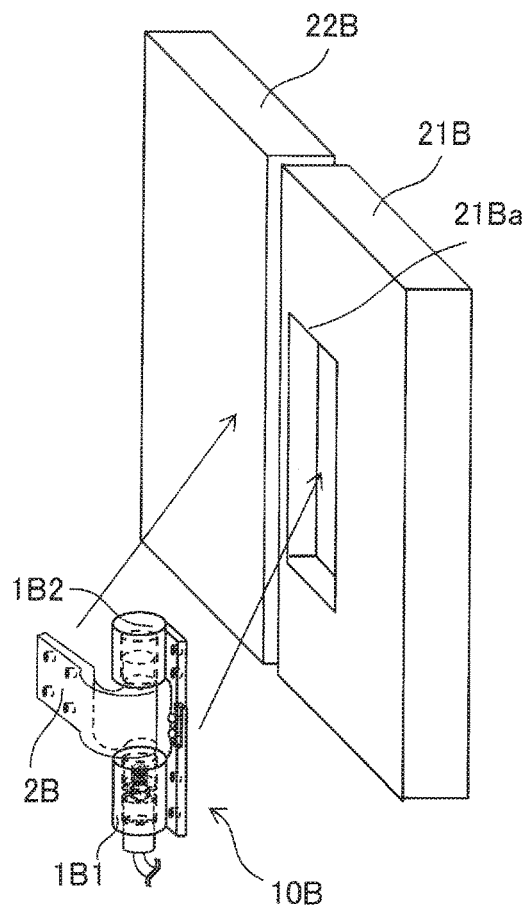
FIG. 24 is a perspective view illustrating a first step of attaching the hinge device 10B of FIG. 18, to a door including a stationary object 21B and a movable object 22B.
Figure 25:
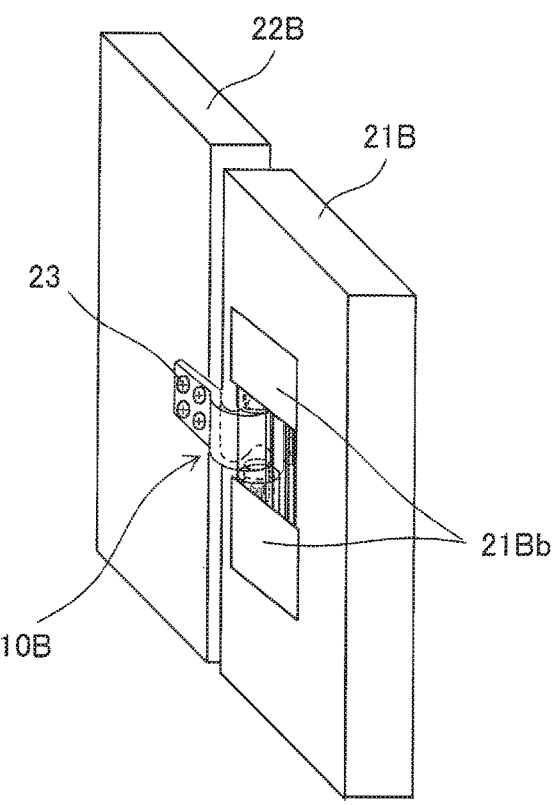
FIG. 25 is a perspective view illustrating a second step of attaching the hinge device 10B of FIG. 18, to the door including the stationary object 21B and the movable object 22B.
Figure 26:
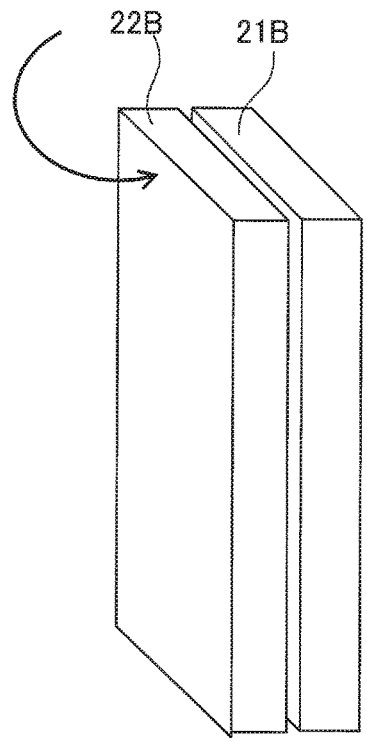
FIG. 26 is a perspective view illustrating a third step of attaching the hinge device 10B of FIG. 18, to the door including the stationary object 21B and the movable object 22B.

FIGS. 24 to 26 are perspective views illustrating first to third steps of attaching the hinge device 10B of FIG. 18, to a door including a stationary object 21B and a movable object 22B. As shown in FIG. 24, the stationary object 21B has a recess 21Ba for accommodating the hinge device 10B. The hinge components 1B1 and 1B2 are fixed to the stationary object 21B in the recess 21Ba thereof with a plurality of screws (not shown). Similarly, the hinge component 2B is fixed to the movable object 22B with a plurality of screws 23. As shown in FIG. 25, after the hinge components 1B1 and 1B2 are fixed to the stationary object 21B, the recess 21Ba of the stationary object 21B may be covered with covers 21Bb. Thereafter, as shown in FIG. 26, when the user opens or closes the door, the movable object 22B rotates with respect to the stationary object 21B about the reference axis of the hinge device 10B. At this time, the power generating device 3 generates electric power by rotation of the input shaft.

The protrusion 34 of the power generating device 3 and the recess 2Bb of the hinge component 2B, being shaped complementary to each other, are not limited to be shaped like gears, but may be shaped in any other shape, as long as the input shaft 31 of the power generating device 3 can be restrained to the hinge component 2B.

Figure 27:
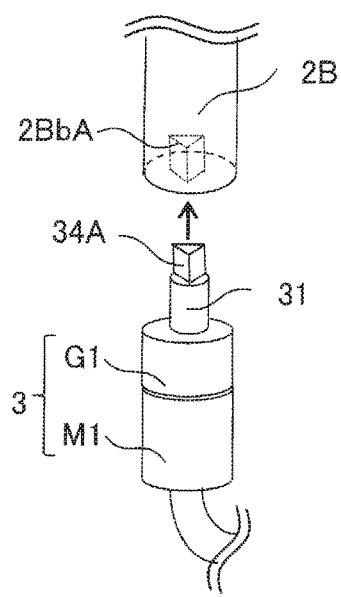
FIG. 27 is a perspective view illustrating configurations of a power generating device 3 and a hinge component 2B according to a first modified embodiment of the second embodiment.

FIG. 27 is a perspective view illustrating configurations of a power generating device 3 and a hinge component 2B according to a first modified embodiment of the second embodiment. The input shaft 31 of the power generating device 3 may have a triangular protrusion 34A, and the hinge component 2B may have a complementary triangular recess 2BbA.

Figure 28:
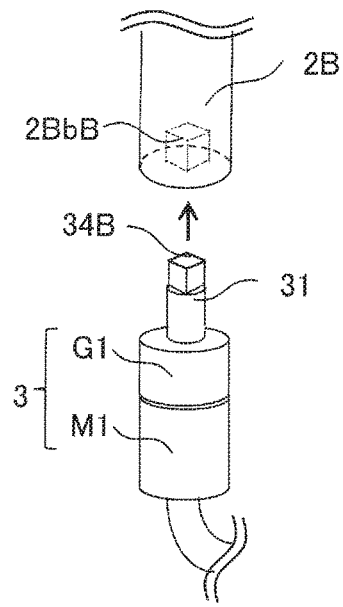
FIG. 28 is a perspective view illustrating configurations of a power generating device 3 and a hinge component 2B according to a second modified embodiment of the second embodiment.

FIG. 28 is a perspective view illustrating configurations of a power generating device 3 and a hinge component 2B according to a second modified embodiment of the second embodiment. The input shaft 31 of the power generating device 3 may have a quadrangular protrusion 34B, and the hinge component 2B may have a complementary quadrangular recess 2BbB.

Figure 29:
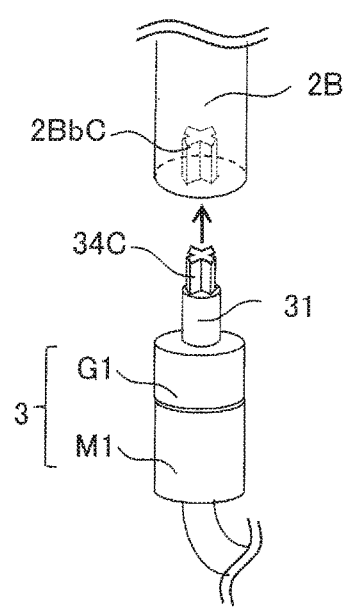
FIG. 29 is a perspective view illustrating configurations of a power generating device 3 and a hinge component 2B according to a third modified embodiment of the second embodiment.

FIG. 29 is a perspective view illustrating configurations of a power generating device 3 and a hinge component 2B according to a third modified embodiment of the second embodiment. The input shaft 31 of the power generating device 3 may have a cross-shaped protrusion 34C, and the hinge component 2B may have a complementary cross-shaped recess 2BbC.

In addition, the input shaft 31 of the power generating device 3 may have a recess of some shape and the recess 2Bb of the hinge component 2B may have a protrusion of a complementary shape.

The hinge devices according to the second embodiment are characterized by the following configurations.

According to the hinge device of the second embodiment, the input shaft of the power generating device 3 and the recess of the hinge component 2B may be shaped complementary to each other as seen from the point on the reference axis.

As a result, the input shaft 31 of the power generating device 3 rotates by as much as rotation of the second hinge component 2B when the second hinge component 2B rotates about the reference axis. The protrusion 34 of the power generating device 3 and the recess 2Bb of the hinge component 2B, being shaped complementary to each other, do not have to restrain the input shaft 31 of the power generating device 3 to the hinge component 2B with respect to the longitudinal direction of the reference axis. Accordingly, when the hinge components 1B1 and 1B12 support the hinge component 2B, the weight of the hinge component 2B is not applied to the power generating device 3. Therefore, it is possible to reliably operate the power generating device 3, without applying an extra mechanical load to the power generating device 3.

According to the hinge device of the second embodiment, the hinge components 1B1 and 1B2 may include the first portion (hinge component 1B1) and the second portion (hinge component 1B2). The hinge component 2B has the first and second ends along the reference axis, and the hinge component 2B is engaged with the hinge component 1B1 at the first end, and engaged with the hinge component 1B2 at the second end. The hinge components 1B1 and 1B2 are coupled to each other.

As a result, using the hinge device 10B, it is possible to easily build, for example, a door including a stationary object and a movable object.

According to the second embodiment, additionally or alternatively, the power generating device 3 may be provided in the hinge component 1B2.

The first and second embodiments may be combined with each other. For example, in the first embodiment, the tip of the input shaft 31 of the power generating device 3 and the recess 2a of the hinge component 2 may be shaped complementary to each other, instead of the dent 32 and the screw 41. In addition, in the second embodiment, the input shaft 31 of the power generating device 3 may be restrained to the hinge component 2B by a screw 41 penetrating the hinge component 2B. Various methods for restraining the input shaft 31 of the power generating device 3 to the hinge component 2B can be selected according to usage and size. In addition, in the first embodiment, the hinge component 1 may have a recess to be engaged with the hinge component 2, and the hinge component 2 may have a protrusion to be engaged with the hinge component 1. In addition, in the second embodiment, at least one of the hinge components 1B1 and 1B2 may have a protrusion to be engaged with the hinge component 2B, and the hinge component 2B may have a corresponding recess.

Third Embodiment

If the capacitors of the power storage circuit 12 have small capacitance, the battery is fully charged in a moment, and part of the generated electric power may be wasted. In addition, if the capacitors of the power storage circuit 12 have large capacitance, their size and cost increase. For a power generation system provided with the power generating device 3, the rectifier circuit 11, and the power storage circuit 12, it is an important issue to determine the capacitance of the capacitors of the power storage circuit 12 in consideration of various requirements. Accordingly, it is required to easily determine the optimal or nearly optimal capacitance of capacitors, and to provide a power system provided with such capacitors.

According to the third embodiment, a power system is provided, the power system being provided with capacitors having capacitance determined so as to reduce waste in generated electric power, without excessively increased size and cost.

In power systems according to embodiments of the present disclosure, it would be advantageous that the power generating device 3 can generate a voltage as large as possible, when mechanical energy is inputted at a small angular velocity as slow as possible. Accordingly, hereinafter, we will illustrate a case of using a combination of a gear mechanism G1 having a high increasing gear ratio, and a power generator M1 having a high rated output voltage.

Hereinafter, we will describe a simulation performed by the present inventor.

In the simulation, a planetary gear mechanism having a decreasing gear ratio of $1/G=1/242$, and a micromotor having a rated input voltage $V_m=24$ (V) were combined, and the combination of the planetary gear mechanism and the micromotor was used as the power generating device 3. In this case, it is necessary to obtain a large speed electromotive force (voltage at output terminals of the power generator), when the input shaft is rotated slowly at a small angular velocity. Where, "Nma" (rpm) denotes the rotational speed of the output shaft of the motor when no load is applied, and "Nda" (rpm) denotes the rotational speed of the output shaft of the gear mechanism when no load is applied. When a voltage 24 (V) is applied to the motor, the no-load rotational speed Nda (rpm) is 28 (rpm). Under such conditions, we obtain design values necessary for using this motor as a power generator.

At first, we describe calculation of the counter electromotive voltage constant Ked (V/(rad/s)). The counter electromotive voltage constant Ked is an important indicator indicating the voltage across the output terminals of the power generating device 3, with respect to the rotational speed of the input shaft of the power generating device 3. As the counter electromotive voltage constant Ked becomes larger, a larger voltage output can be obtained from slow rotation. The SI units (International System of Units) are used throughout the present disclosure. By converting the rotational speed Nda=28 (rpm) of the output shaft of the gear mechanism, when no load is applied, into SI units, the rotational angular velocity coda (rad/s) is obtained as follows.

$$\omega da = 28 \times 2 \times \pi/60 = 2.932 \text{ (rad/s)}$$

Accordingly, the counter electromotive voltage constant Ked of the gear mechanism and the motor is obtained as follows.

$$Ked = 24/(28 \times 2 \times \pi/60)$$

$$= 24/2.932$$

$$= 8.185 \text{ (V/(rad/s))}$$

For reference, the counter electromotive voltage constant Kem (V/(rad/s)) of only the motor, not including the gear mechanism, is obtained as follows.

$$Kem = Ked/G$$

$$= 24/(28 \times 2 \times \pi/60)/242$$

$$= 0.03382 \text{ (V/(rad/s))}$$

Next, we will describe calculation of the output voltage $E_m$ (V) of the power generating device 3.

In a case where the above-described motor and gear mechanism are used as the power generating device 3, the gear mechanism has an increasing gear ratio $G=242$. In this case, rotational torque Td is applied to the input shaft of the gear mechanism. The corresponding rotational angular velocity ωd (rad/s) is obtained from the duration "t" (s) and the rotational angle $\theta d_d$ (degree) of the single opening or closing action of the door. Suppose $t=1$ (s) and $\theta d_d=90$ (degrees), then, $\theta d=90\times\pi/180=\pi/2$ (rad), and therefore, $\omega d$ (rad/s) is obtained as follows.

$$\omega d=(\pi/2)/1=1.571 \text{ (rad/s)}$$

For reference, the rotational angular velocity $\omega m$ (rad/s) of only the motor, not including the gear mechanism, is obtained as follows.

$$\omega m=G\times\omega d=380.2 \text{ (rad/s)}$$

In this case, since Ked=8.185 (V/(rad/s)), the output voltage $E_m$ (V) of the power generating device 3 is obtained as follows.

$$E_m(V)=Ked\times\omega d=8.185\times1.571=12.86$$

That is, in a case where the door is opened at a constant speed of 90 degrees per second, the voltage generated at the output terminals of the power generating device 3 (speed electromotive force) is 12.86 (V).

Next, we will describe operations of the rectifier circuit 11 and the power storage circuit 12. Hereinafter, it is assumed that the rectifier circuit 11 and the power storage circuit 12 are configured as shown in FIG. 10.

Figure 30:
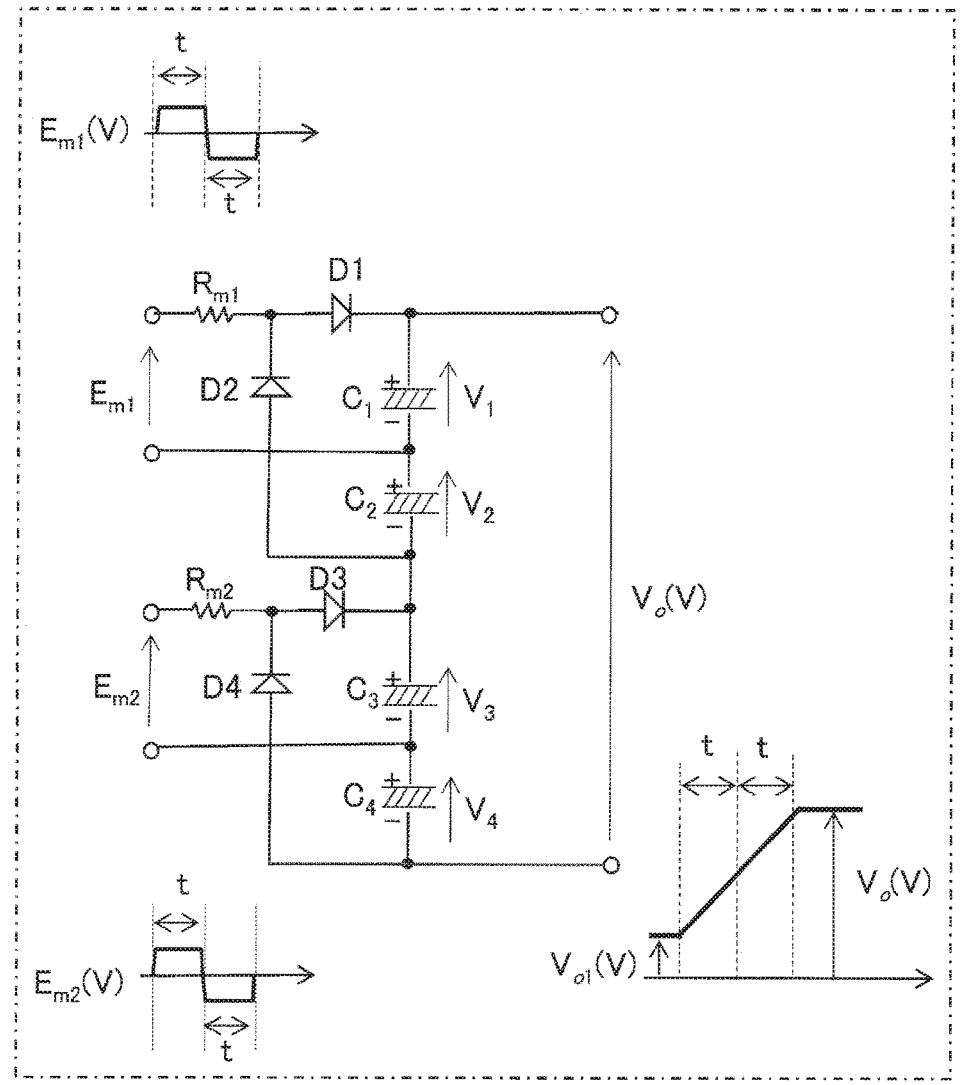
FIG. 30 is a schematic diagram for illustrating operations of four capacitors C1 to C4 in a power system according to a third embodiment.

FIG. 30 is a schematic diagram for illustrating operations of the four capacitors C1 to C4 in the power system according to the third embodiment. As mentioned above, voltage-doubling rectification is applied to voltage generated by the two power generators M1 and M2, and the capacitors C1 to C4 to be charged with voltage generated by the power generators M1 and M2 are cascaded with each other. In this case, we will investigate electrical energy to be stored by opening and then closing the door only once.

"$E_{m1}$" and "$E_{m2}$" denote output voltages of the power generators M1 and M2, respectively. "$R_{m1}$" and "$R_{m2}$" denote resistances of winding of the power generators M1 and M2, respectively. "$C_1$" to "$C_4$" denote capacitances of the capacitors C1 to C4, respectively. "$V_1$" to "$V_4$" denote voltages stored in the capacitors C1 to C4, respectively. "$V_o$" denotes a voltage across the four cascaded capacitors C1 to C4. In this case, each of waveforms of the voltages $E_{m1}$ and $E_{m2}$ represents a rectangular wave (AC voltage waveform) generated from the opening and closing actions of the door. The waveform of the voltage $V_o$ indicates the change over time in the stored voltage, depending on time constants of the resistances $R_{m1}$ and $R_{m2}$ and the capacitances $C_1$ to $C_4$. In the embodiment, the energy stored in the capacitors C1 to C4 is not completely consumed until the voltage across the capacitors C1 to C4 becomes zero, but supplying electric power from the power storage circuit 12 to the load device 14 is stopped when the voltage of one capacitor drops to a predetermined threshold voltage $V_{01}$ (V). Accordingly, when charging one capacitor, a state of the lower limit voltage (initial voltage) $V_{01}$ (V), and a state of the voltage $V_1$ at the end of the door opening/closing action are repeated.

Figure 31:
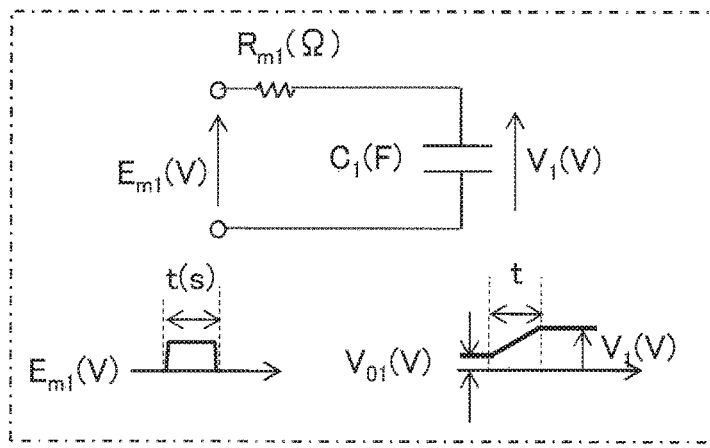
FIG. 31 is a schematic diagram for illustrating operation of one capacitor in the power system according to the third embodiment.

FIG. 31 is a schematic diagram for illustrating operation of one capacitor. C1 in the power system according to the third embodiment. Referring to FIG. 31, we analyze the operation of storing electric power generated by one power generator M1 when opening the door, in one capacitor C1. In the embodiment, this operation serves as a building block, and when the door is opened and closed only once in the electric power system including two power generators M1 and M2, a stored energy four times that of the building block operation is obtained.

Referring to FIG. 31, the voltage $V_1$ (V) across the capacitor C1 is obtained as follows.

$$V_1=V_{01}+(E_{m1}-V_{01})(1-e^{-t/\tau_1}) \quad \text{[Mathematical Expression 1]}$$

Where, "$V_{01}$" (V) denotes the lower limit voltage of the capacitor C1, as described above. "$\tau_1$" denotes a time constant $\tau_1=C_1 R_{m1}$, based on the capacitance $C_1$ of the capacitor C1, and the resistance $R_{m1}$ of the power generator M1.

Accordingly, the maximum energy $W_{E1M}$ (J) to be stored in the capacitor C1 is obtained as follows.

$$W_{E1M}=\tfrac{1}{2}C_1 V_1^2 \quad \text{[Mathematical Expression 2]}$$

The available energy $W_{E1}$ (J) to be supplied from the capacitor C1 to the load device 14 is obtained as follows.

$$W_{E1}=\tfrac{1}{2}C_1 V_1^2-\tfrac{1}{2}C_1 V_{01}^2=\tfrac{1}{2}C_1(V_1^2-V_{01}^2) \quad \text{[Mathematical Expression 3]}$$

For exemplary calculation, it is assumed that $V_{01}$=1.5 (V), $C_1$=0.01 (F), $R_{m1}$=60 (Ω), t=1 (s), and $E_{m1}$=12.86 (V). In this case, the voltage across the capacitor C1 is: $V_1$=10.712 (V). The maximum energy to be stored in the capacitor C1 is: $W_{E1M}$=0.5738 (J). The available energy to be supplied from the capacitor C1 to the load device 14 is: $W_{E1}$=0.5625 (J).

Next, we calculate the energy to be stored in all the capacitors C1 to C4 of FIG. 30. In this case, conditions $V_1=V_2=V_3=V_4$ and $V_{01}=V_{02}=V_{03}=V_{04}$ are set. Then, the following equations are obtained.

$$V_o=V_1+V_2+V_3+V_4=4V_1=42.8 \text{ } (V)$$

$$V_{o1}=V_{01}+V_{02}+V_{03}+V_{04}=4V_1=6 \text{ } (V)$$

Conditions $C_1=C_2=C_3=C_4$ are set. The total capacitance $C_o$ of the capacitors C1 to C4 is given by $C_o=(\tfrac{1}{4})C_1$. The total stored energy $W_{EM}$ (J) of the capacitors C1 to C4 is obtained as follows.

$$W_{EM}=4\times W_{E1M}=2C_1 V_1^2=2.295 \text{ } (J)$$

The available energy $W_{EE}$ (J) of the capacitors C1 to C4 is obtained as follows.

$$\begin{aligned}
W_{EE} &= \tfrac{1}{2}C_o(V_o^2 - V_{o1}^2) \quad \text{[Mathematical Expression 4]}\\
&= \tfrac{1}{2}\cdot\left(\tfrac{1}{4}C_1\right)\cdot((4V_1)^2 - (4V_{01})^2)\\
&= \tfrac{1}{2}\cdot\left(\tfrac{1}{4}C_1\right)\cdot 16(V_1^2 - V_{01}^2)\\
&= 2C_1(V_1^2 - V_{01}^2)
\end{aligned}$$

The available energy $W_{EE}$ is, for example, 2.25 (J).

In addition, the average output electric power $P_{EM}$ (W) from the power generators M1 and M2 is obtained as follows.

$$P_{EM}=W_{EM}/(2t)=2.295/(2\times1)=1.147 \text{ } (W)$$

According to the example as described above, we confirmed that the power system according to the embodiment can generate electric power exceeding 1 (W) and 1 (J).

Next, we calculate characteristics of the available energy of the capacitors C1 to C4, when changing some parameters of the mathematical expressions as described above.

Figure 32:
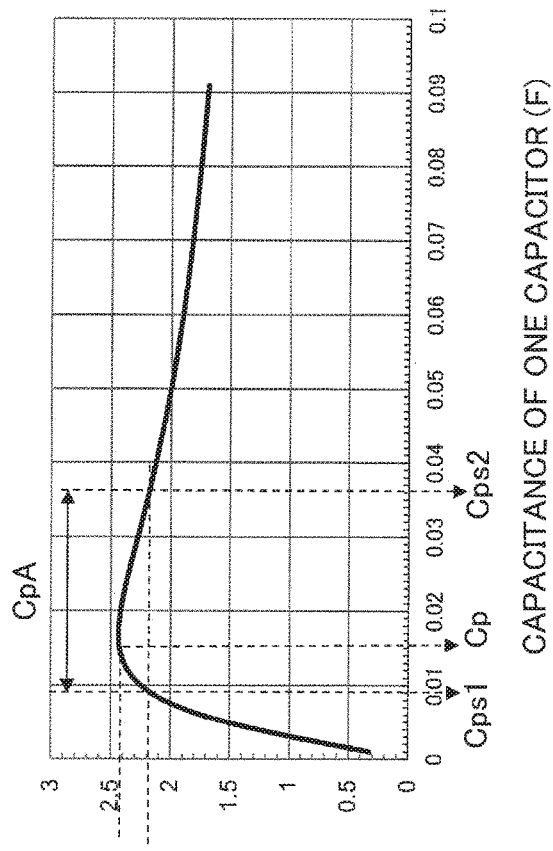
FIG. 32 is a graph showing characteristics of available energy to capacitance of a power system according to a first implementation example of the third embodiment.
Figure 33:
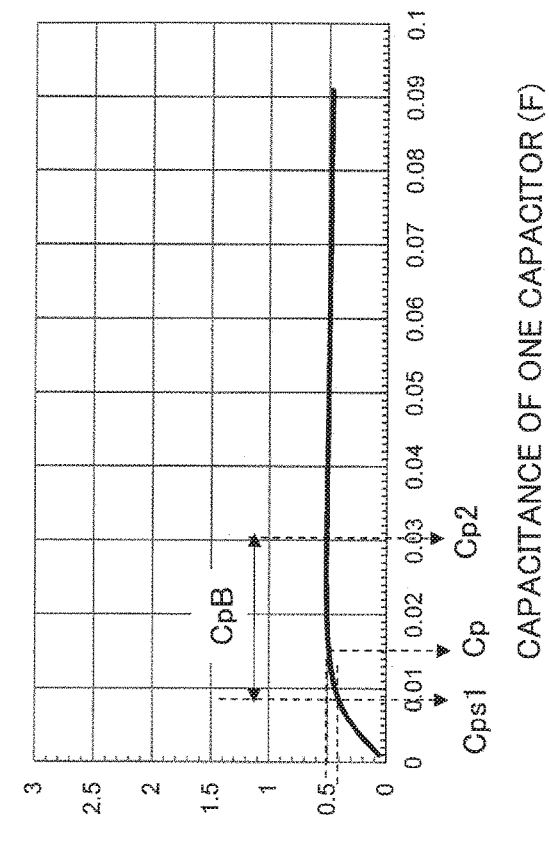
FIG. 33 is a graph showing characteristics of available energy to capacitance of a power system according to a second implementation example of the third embodiment.

FIG. 32 is a graph showing characteristics of available energy to capacitance of a power system according to a first implementation example of the third embodiment. FIG. 33 is a graph showing characteristics of available energy to capacitance of a power system according to a second implementation example of the third embodiment.

In the implementation examples of FIGS. 32 and 33, the following common parameters were set.

Duration during which door is opened once: t=1 (s)
Duration during which door is closed once: t=1 (s)
Angie through which door is opened and closed: 90 (degrees)
Motor's rated input voltage: $V_m$=24 (V)
Motor's winding resistance: $R_{m1}=R_{m2}$=60 (Ω)
Capacitances of capacitors C1 to C4: variable
Lower limit voltage of capacitors C1 to C4: $V_{01}=V_{02}=V_{03}=V_{04}$=1.5 (V)

In the implementation example of FIG. 32, the following parameters were set.
Increasing gear ratio of gear mechanism: G=242
Counter electromotive voltage constant of each power generating device: Ked=8.185 (V/(rad/s))
Speed electromotive force: $E_{m1}=E_{m2}$=12.857 (V)

In the implementation example of FIG. 33, the following parameters were set.
Increasing gear ratio of gear mechanism: G=107
Counter electromotive voltage constant of each power generating device: Ked=3.62 (V/(rad/s))
Speed electromotive force: $E_{m1}=E_{m2}$=5.69 (V)

Under such conditions, the characteristics of available energy to capacitance were calculated as shown in FIGS. 32 and 33, the characteristics being calculated as an upper limit available energy to be stored in the capacitors C1 to C4, with respect to the capacitance of each of the capacitors C1 to C4.

Referring to FIGS. 32 and 33, it can be seen that even when increasing the capacitances of the capacitors C1 to C4, the available energy reaches the upper limit at a certain capacitance. In addition, in the case of FIG. 32, it can be clearly seen that the available energy has a peak value. Comparing FIGS. 32 and 33 with each other, the available energy reaches the maximum at the capacitance of about 15 mF. The existence of this maximum can be explained by the fact that the output voltages $E_{m1}$ and $E_{m1}$ of the power generating devices are the same in cases of FIGS. 32 and 33, and the fact that the windings of the power generators M1 and M2 have resistances $R_{m1}$ and $R_{m2}$, respectively. According to such characteristics, it can be seen that the available energy reaches the peak value at the capacitance of about 15 mF. Therefore, it can be seen that even when using capacitors having larger capacitances, their size and cost adversely increase. The capacitances of the capacitors C1 to C4 are gradually increased, and then, when the available energy approaches the peak value, the corresponding capacitance Cp is determined as the energy-maximizing capacitance. According to the power system of the embodiment of the present disclosure, it can be seen that when selecting the energy-maximizing capacitance Cp as a design value, it is possible to achieve the maximum or nearly maximum performance with small size and low cost.

The capacitances of the capacitors C1 to C4 are not necessarily strictly identical to the peak available energy. For example, in a case where the available energy has a clear peak value as shown in FIG. 32, a capacitance may be selected from a range of capacitance corresponding to 80% (20% lower) to 90% (10% lower) of the strict peak available energy based on experiment. The range of capacitance is from a capacitance Cps1 lower than the energy-maximizing capacitance Cp, to a capacitance Cps2 higher than the energy-maximizing capacitance Cp, the energy-maximizing capacitance Cp corresponding to the strict peak available energy. In this case, the reason for selecting the capacitances Cps1 and Cps2 corresponding to 80% to 90% of the peak available energy is to consider the range of variations of typical components.

In addition, as shown in FIG. 33, after the available energy has reached the strict peak value based on experiment, the magnitude of the available energy may not much change from the peak value, even when further increasing the capacitances of the capacitors C1 to C4. In this case, when the energy-maximizing capacitance Cp corresponds to the strict peak available energy, a capacitance may be selected from a range of capacitance, having a lower limit capacitance Cps1 corresponding to an available energy between 80% (20% lower) to 90% (10% lower) of the peak available energy (capacitance lower than the energy-maximizing capacitance Cp), and an upper limit capacitance Cp2 twice the energy-maximizing capacitance Cp. In this case, the reason for setting the upper limit twice the energy-maximizing capacitance Cp is that the capacitors' size is nearly doubled and their cost also increases accordingly, and it is considered that a capacitance up to twice the energy-maximizing capacitance Cp is acceptable as a small and inexpensive power system.

Thus, according to the power system of the third embodiment, since electric power can be stored in capacitors capable of substantially maximizing the stored energy, it is possible to optimize the use of generated electric power for operating a load device. In addition, according to the power system of the third embodiment, since the maximum energy can be stored and utilized while using the smallest and the most inexpensive capacitors, it is possible to provide a small and inexpensive power generation system.

In the above description, we calculated the characteristics of available energy to capacitance, indicating the upper limit available energy to be stored in the power storage circuit 12, with respect to the capacitance of the power storage circuit 12. However, instead of the characteristics of available energy to capacitance, the characteristics of energy to capacitance may be calculated, indicating an upper limit energy to be stored in the power storage circuit 12, with respect to the capacitance of the power storage circuit 12. Also in the case of calculating the characteristics of energy to capacitance, a capacitance equal to or near the energy-maximizing capacitance can be set as the capacitance of the power storage circuit 12, the energy-maximizing capacitance indicating the capacitance maximizing the upper limit energy in the characteristics of energy to capacitance.

The power generation systems and the power systems according to the third embodiment are characterized by the following configurations.

According to the power generation system of the third embodiment, the power generation system is provided with: at least one power generating device 3 that generates electric power by rotation of the input shaft 31; and the power storage circuit 12 including at least one capacitor C1 to C4, that stores the energy of the electric power generated by the power generating device 3. The power storage circuit 12 has a capacitance equal to or near the energy-maximizing capacitance, the energy-maximizing capacitance indicating a capacitance maximizing the upper limit energy in the characteristics of energy to capacitance, the characteristics being calculated as the upper limit energy to be stored in the power storage circuit 12, with respect to the capacitance of the power storage circuit 12. The characteristics of energy to capacitance are calculated based on: the capacitance of the power storage circuit 12, the electromotive force of the power generating device 3, the internal resistance of the power generating device 3, and the duration of one power generating action of the power generating device 3.

As a result, it is possible to provide a power generation system provided with capacitors having capacitance determined so as to reduce waste in generated electric power, without excessively increasing size and cost.

According to the power generation system of the third embodiment, the power storage circuit 12 may have a capacitance within a range of capacitance corresponding to a range of energy whose upper limit is equal to or greater than a predetermined value near the maximum energy in the characteristics of energy to capacitance.

As a result, it is possible to maximize or nearly maximize the upper energy in the characteristics of energy to capacitance, while using small and inexpensive capacitors.

According to the power generation system of the third embodiment, the power storage circuit 12 may have a capacitance within a range of capacitance corresponding to a range of energy whose upper limit is equal to or greater than a predetermined value between 80% to 90% of the maximum energy in the characteristics of energy to capacitance.

As a result, in consideration of the range of variations of typical components, it is possible to nearly maximize the upper limit energy in the characteristics of energy to capacitance, while using small and inexpensive capacitors.

According to the power generation system of the third embodiment, the power storage circuit 12 may have a capacitance within a range of capacitance corresponding to a range of energy whose upper limit is equal to or greater than a predetermined value near the maximum energy in the characteristics of energy to capacitance, the range of capacitance having a lower limit capacitance smaller than the energy-maximizing capacitance, and an upper limit capacitance obtained by multiplying the energy-maximizing capacitance by a factor larger than one.

As a result, it is possible to nearly maximize the upper limit energy in the characteristics of energy to capacitance, while using small and inexpensive capacitors, i.e., keeping increases in the capacitors' size and cost small to an acceptable extent.

According to the power generation system of the third embodiment, the power storage circuit 12 may have a capacitance within a range of capacitance corresponding to a range of energy whose upper limit is equal to or greater than a predetermined value between 80% to 90% of the maximum energy in the characteristics of energy to capacitance, the range of capacitance having a lower limit capacitance smaller than the energy-maximizing capacitance, and an upper limit capacitance twice the energy-maximizing capacitance.

As a result, it is possible to maximize or nearly maximize the upper limit energy in the characteristics of energy to capacitance, while using small and inexpensive capacitors, i.e., keeping increases in the capacitors' size and cost small to an acceptable extent.

According to the power generation system of the third embodiment, the characteristics of energy to capacitance may be obtained by:

$$W_{E1M} = \tfrac{1}{2} C_1 (V_{01} + (E_{m1} - V_{01})(1 - e^{-t/\tau_1}))^2 \quad \text{[Mathematical Expression 5]}$$

where, "$C_1$" denotes the capacitance of the capacitor C1 of the power storage circuit 12; "$V_{01}$" denotes the lower limit voltage of the capacitor C1; "$E_{m1}$" denotes the electromotive force of the power generating device 3; "t" denotes the duration of one power generating action of the power generating device 3; and "$\tau_1$" denotes the time constant, based on the capacitance $C_1$ of the capacitor C1, and the internal resistance of the power generating device 3.

As a result, it is possible to calculate the energy-maximizing capacitance based on the characteristics of energy to capacitance.

According to the power generation system of the third embodiment, the power generating device 3 may be provided with: the gear mechanism G1 that transmits rotation of the input shaft 31 of the power generating device 3 at the increasing gear ratio; and the power generator M1 that generates electric power by rotation transmitted by the gear mechanism G1.

As a result, it is possible to efficiently generate electric power from energy obtained from the user's living activities, using the gear mechanism G1.

According to the power generation system of the third embodiment, the power generation system may be provided with the plurality of power generating devices 3 cascaded with each other.

As a result, it is possible to generate a higher voltage or a larger current, as compared with a case where a single power generating device 3 is provided.

According to the power generation system of the third embodiment, the power generation system may be further provided with the rectifier circuit 11 that rectifies the electric power generated by the power generating device 3. The power storage circuit 12 stores energy of the electric power generated by the power generating device 3 and rectified by the rectifier circuit 11.

As a result, it is possible to generate AC power by the power generating device 3, and store the energy of the AC power in the power storage circuit 12.

According to the power generation system of the third embodiment, the power storage circuit 12 may include the plurality of capacitors C1 to C4, The rectifier circuit 11 includes the voltage-doubling rectifier circuit.

As a result, it is possible to store twice voltage in a series of actions, as compared to the case of the full-wave rectification. Accordingly, it is possible to operate the subsequent-stage circuits of the power storage circuit 12 at a high voltage, and therefore, improve the efficiency of the subsequent-stage circuits.

According to the power generation system of the third embodiment, the power generation system may be further provided with the hinge device 10 provided with the first hinge component 1 and the second hinge component 2 having the common reference axis. The first hinge component 1 and the second hinge component 2 are engaged with each other, so as to be rotatable about the reference axis relative to each other, and so that one of the first hinge component 1 and the second hinge component 2 supports the other. The housing 30 of the power generating device 3 is fixed to the first hinge component 1, so that the input shaft 31 of the power generating device 3 is positioned on the reference axis. The input shaft 31 of the power generating device 3 is restrained to the second hinge component 2 with respect to the direction of rotation about the reference axis, so that the input shaft 31 of the power generating device 3 rotates by as much as rotation of the second hinge component 2 when the second hinge component 2 rotates about the reference axis.

As a result, it is possible to provide the hinge device 10 provided with the power generating device 3, the hinge device 10 being capable of efficiently extracting energy from the user's living activities to generate electric power.

According to the power system of the third embodiment, the power system is provided with: the power generation system; the controller circuit 13 that controls discharging of the power storage circuit 12 of the power generation system;

and the load device 14 that consumes the electric power of the power storage circuit 12 under control of the controller circuit 13.

As a result, using the controller circuit 13 and the load device 14, it is possible to effectively utilize electric power generated from energy obtained from the user's living activities, according to usage of the load device 14.

According to the power system of the third embodiment, the controller circuit 13 may supply electric power from the power storage circuit 12 to the load device 14, simultaneously with power generating action of the power generating device 3, or after the predetermined time has elapsed from the power generating action of the power generating device 3, or independently of the power generating action of the power generating device 3.

As a result, it is possible to operate the load device 14 at any moment, including during, after, and before operation of the power generating device 3. Accordingly, it is possible to effectively utilize electric power generated from energy obtained from the user's living activities, according to usage of the load device 14.

According to the power system of the third embodiment, the controller circuit 13 may stop supplying electric power from the power storage circuit 12 to the load device 14, when the voltage across the capacitors C1 to C4 of the power storage circuit 12 is equal to or lower than the predetermined lower limit voltage.

As a result, it is possible to fully utilize the energy of the capacitors C1 to C4, and reliably operate the load device 14.

According to the power system of the third embodiment, the load device 14 may include a lighting device.

As a result, the power system including the lighting device can be utilized for purposes of, e.g., lighting, warning to a suspicious person, and/or prevention of entry of a suspicious person.

According to the power system of the third embodiment, the load device 14 may include a communication device.

As a result, the power system including the communication device can be utilized for purposes of, e.g., watching an elderly person and/or notification of a suspicious person.

REFERENCE SIGNS LIST 1, 1-1, 1-2, 1A, 1B1, 1B2: HINGE COMPONENT (FIRST HINGE COMPONENT)
2, 2-1, 2-2, 2A, 2B: HINGE COMPONENT (SECOND HINGE COMPONENT)
3: POWER GENERATING DEVICE
10, 10-1, 10-2, 10A, 10B: HINGE DEVICE
11: RECTIFIER CIRCUIT
12: POWER STORAGE CIRCUIT
13: CONTROLLER CIRCUIT
14: LOAD DEVICE
14a: LIGHT EMITTING DIODE (LIGHTING DEVICE)
14b1: WIRELESS TRANSMITTER (COMMUNICATION DEVICE)
14b2: WIRELESS RECEIVER
21, 21B: STATIONARY OBJECT
22, 22B: MOVABLE OBJECT
30a, 30b: HOUSING
31: INPUT SHAFT
32: DENT
33: GEAR
34, 34A to 34C: PROTRUSION
41: SCREW
C1 to C4: CAPACITOR
D1 to D4: DIODE
G1: GEAR MECHANISM
M1, M2: POWER GENERATOR

The invention claimed is:

1. A hinge device comprising:
first and second hinge components having a common reference axis; and
a power generating device,
wherein the first and second hinge components are engaged with each other, so as to be rotatable about the reference axis relative to each other, and so that one of the first and second hinge components supports the other,
wherein the power generating device comprises a housing and an input shaft, and generates electric power by rotation of the input shaft,
wherein the housing of the power generating device is fixed to the first hinge component, so that the input shaft of the power generating device is positioned on the reference axis,
wherein the input shaft of the power generating device is restrained to the second hinge component with respect to a direction of rotation about the reference axis, so that the input shaft of the power generating device rotates by as much as rotation of the second hinge component when the second hinge component rotates about the reference axis,
wherein the first hinge component has a through hole at a position where the first and second hinge components are engaged with each other, the through hole being formed so that the input shaft of the power generating device protrudes from the first hinge component toward the second hinge component,
wherein the second hinge component is formed to have a recess at a position where the first and second hinge components are engaged with each other, the recess accommodating the input shaft of the power generating device protruding through the through hole,
wherein the input shaft of the power generating device has a dent on a side surface of the input shaft, and
wherein the input shaft of the power generating device is restrained to the second hinge component with respect to a direction of rotation about the reference axis, by a screw extending from outside of the second hinge component to the recess so as to penetrate the second hinge component and contact with the dent in the recess.

2. The hinge device as claimed in claim 1,
wherein the first and second hinge components are engaged with each other so as to be detachable from each other.

3. The hinge device as claimed in claim 1,
wherein the first hinge component includes first and second portions,
wherein the second hinge component has first and second ends along the reference axis, and the second hinge component is engaged at the first end with the first portion of the first hinge component, and engaged at the second end with the second portion of the first hinge component, and
wherein the first and second portions of the first hinge component are coupled to each other.

4. The hinge device as claimed in claim 1,
wherein the power generating device comprises:
a gear mechanism that transmits rotation of the input shaft of the power generating device at an increasing gear ratio; and a power generator that generates electric power by rotation transmitted by the gear mechanism.

5. A hinge device comprising:
first and second hinge components having a common reference axis; and
a power generating device,
wherein the first and second hinge components are engaged with each other, so as to be rotatable about the reference axis relative to each other, and so that one of the first and second hinge components supports the other,
wherein the power generating device comprises a housing and an input shaft, and generates electric power by rotation of the input shaft,
wherein the housing of the power generating device is fixed to the first hinge component, so that the input shaft of the power generating device is positioned on the reference axis,
wherein the input shaft of the power generating device is restrained to the second hinge component with respect to a direction of rotation about the reference axis, so that the input shaft of the power generating device rotates by as much as rotation of the second hinge component when the second hinge component rotates about the reference axis,
wherein the first hinge component has a through hole at a position where the first and second hinge components are engaged with each other, the through hole being formed so that the input shaft of the power generating device protrudes from the first hinge component toward the second hinge component,
wherein the second hinge component is formed to have a recess at a position where the first and second hinge components are engaged with each other, the recess accommodating the input shaft of the power generating device protruding through the through hole, and
wherein the input shaft of the power generating device and the recess of the second hinge component are shaped complementary to each other as seen from a point on the reference axis, so that the input shaft of the power generating device is restrained to the second hinge component with respect to a direction of rotation about the reference axis.

6. A power system comprising: a hinge device, a rectifier circuit, a power storage circuit, a controller circuit, and a load device,
wherein the hinge device comprises:
first and second hinge components having a common reference axis; and
a power generating device,
wherein the first and second hinge components are engaged with each other, so as to be rotatable about the reference axis relative to each other, and so that one of the first and second hinge components supports the other,
wherein the power generating device comprises a housing and an input shaft, and generates electric power by rotation of the input shaft,
wherein the housing of the power generating device is fixed to the first hinge component, so that the input shaft of the power generating device is positioned on the reference axis,
wherein the input shaft of the power generating device is restrained to the second hinge component with respect to a direction of rotation about the reference axis, so that the input shaft of the power generating device rotates by as much as rotation of the second hinge component when the second hinge component rotates about the reference axis,
wherein the rectifier circuit rectifies electric power generated by the power generating device of the hinge device;
wherein the power storage circuit stores energy of electric power rectified by the rectifier circuit;
wherein the controller circuit controls discharging of the power storage circuit;
wherein the load device consumes electric power of the power storage circuit under control of the controller circuit,
wherein the first hinge component has a through hole at a position where the first and second hinge components are engaged with each other, the through hole being formed so that the input shaft of the power generating device protrudes from the first hinge component toward the second hinge component,
wherein the second hinge component is formed to have a recess at a position where the first and second hinge components are engaged with each other, the recess accommodating the input shaft of the power generating device protruding through the through hole,
wherein the input shaft of the power generating device has a dent on a side surface of the input shaft, and
wherein the input shaft of the power generating device is restrained to the second hinge component with respect to a direction of rotation about the reference axis, by a screw extending from outside of the second hinge component to the recess so as to penetrate the second hinge component and contact with the dent in the recess.

7. The power system as claimed in claim 6,
wherein the power generating device, and at least one of the rectifier circuit, the power storage circuit, and the controller circuit are disposed on the first hinge component of the hinge device.

8. The power system as claimed in claim 6,
wherein at least one of the rectifier circuit, the power storage circuit, and the controller circuit is disposed on the second hinge component of the hinge device.

9. The power system as claimed in claim 6,
wherein one of the first and second hinge components of the hinge device is fixed to a stationary object, and the other is fixed to a movable object,
wherein weight of the movable object is supported by the first and second hinge components and the stationary object, and
wherein, when the movable object rotates with respect to the stationary object about the reference axis of the hinge device, the power generating device generates electric power by rotation of the input shaft.

10. The power system as claimed in claim 9,
wherein at least one of the rectifier circuit, the power storage circuit, and the controller circuit is disposed on the stationary object.

11. The power system as claimed in claim 9,
wherein at least one of the rectifier circuit, the power storage circuit, and the controller circuit is disposed on the movable object.

* * * * *